United States Patent [19]
Freidel et al.

[11] Patent Number: 5,118,334
[45] Date of Patent: Jun. 2, 1992

[54] APPARATUS FOR BENDING GLASS

[76] Inventors: Kenneth L. Freidel, 405 Princeton Ave., Cherry Hill, N.J. 08002; L. Arthur Littleton, 46 W. Walnut Ave., Merchantville, N.J. 08109; William G. Freund, 1333 Belgrade Ave., Burlington, N.J. 08016

[21] Appl. No.: 641,491

[22] Filed: Jan. 15, 1991

Related U.S. Application Data

[62] Division of Ser. No. 417,090, Oct. 4, 1989, Pat. No. 5,009,693.

[51] Int. Cl.⁵ ............................................. C03B 23/023
[52] U.S. Cl. ........................................ 65/273; 65/107; 65/185; 65/289; 198/406; 198/409
[58] Field of Search .................. 65/104, 106, 107, 273, 65/186, 185, 289; 198/406, 409

[56] References Cited

U.S. PATENT DOCUMENTS

| | | | |
|---|---|---|---|
| 4,139,359 | 2/1979 | Johnson et al. | 65/107 |
| 4,540,426 | 9/1985 | Bocelli et al. | 65/273 |
| 4,723,983 | 2/1988 | Erdmann et al. | 65/289 X |
| 4,773,925 | 9/1988 | Schultz | 65/106 |
| 4,881,962 | 11/1989 | Reunamaki et al. | 65/104 |
| 4,909,824 | 3/1990 | McMaster et al. | 65/273 |

Primary Examiner—Robert L. Lindsay
Attorney, Agent, or Firm—John F. A. Earley; John F. A. Earley, III

[57] ABSTRACT

A roller assembly for bending sheets of glass, including a plurality of units each comprising a plurality of rollers mounted on support shafts. The support shafts pivot, which tilts the rollers, so that the surface of each roller is tangent to the bottom of the bent glass sheet.

8 Claims, 28 Drawing Sheets

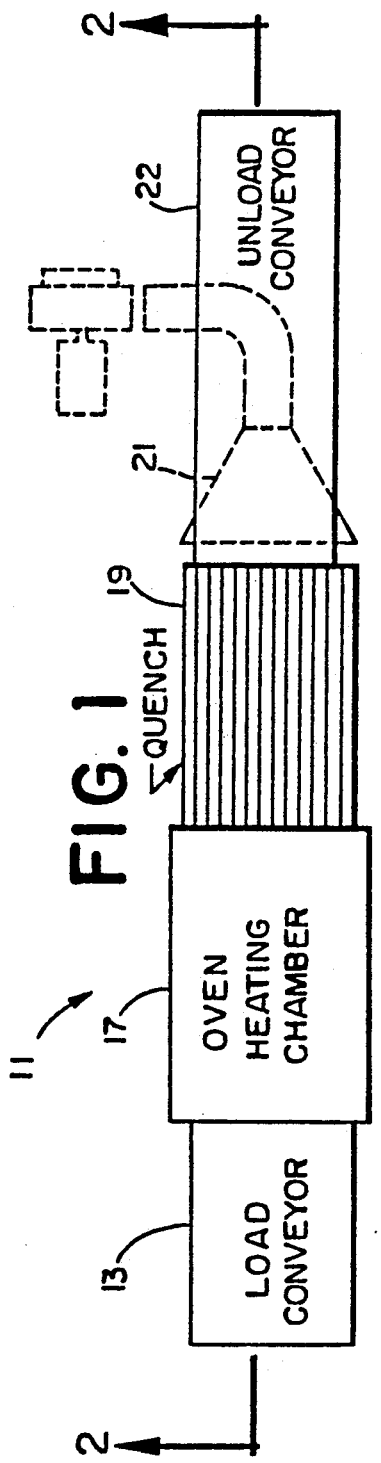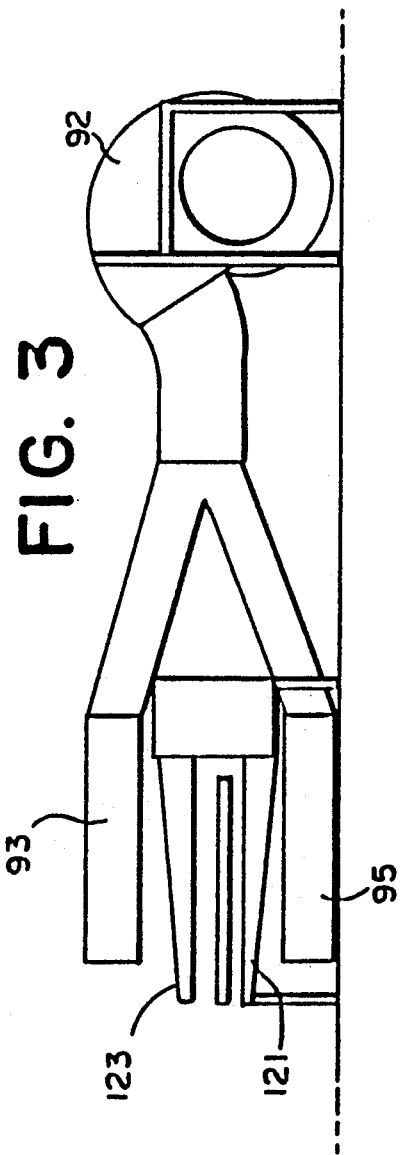

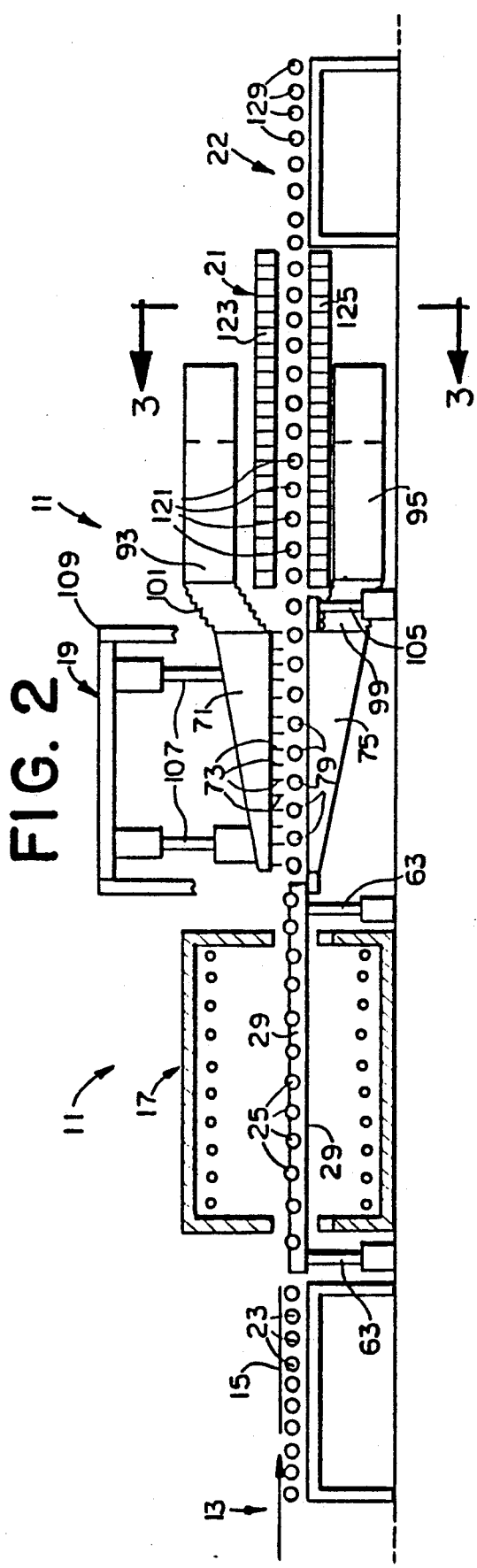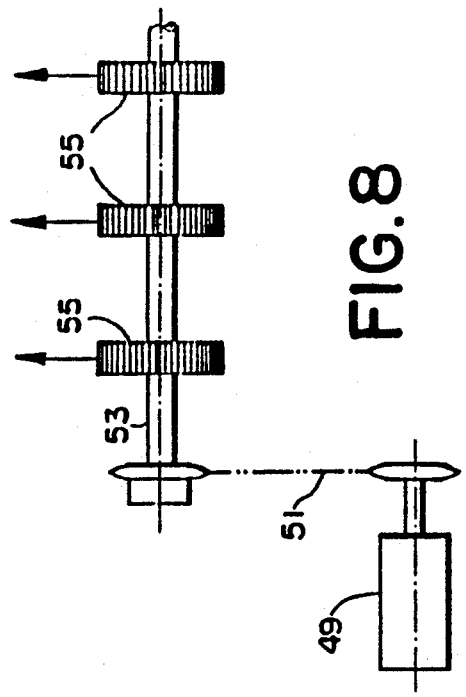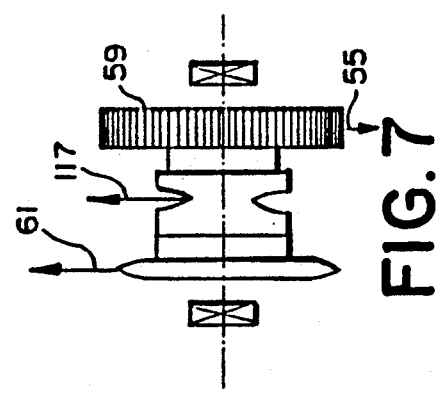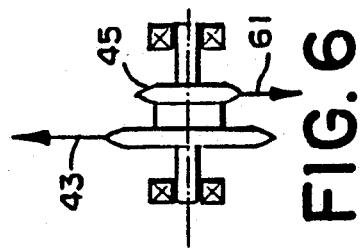

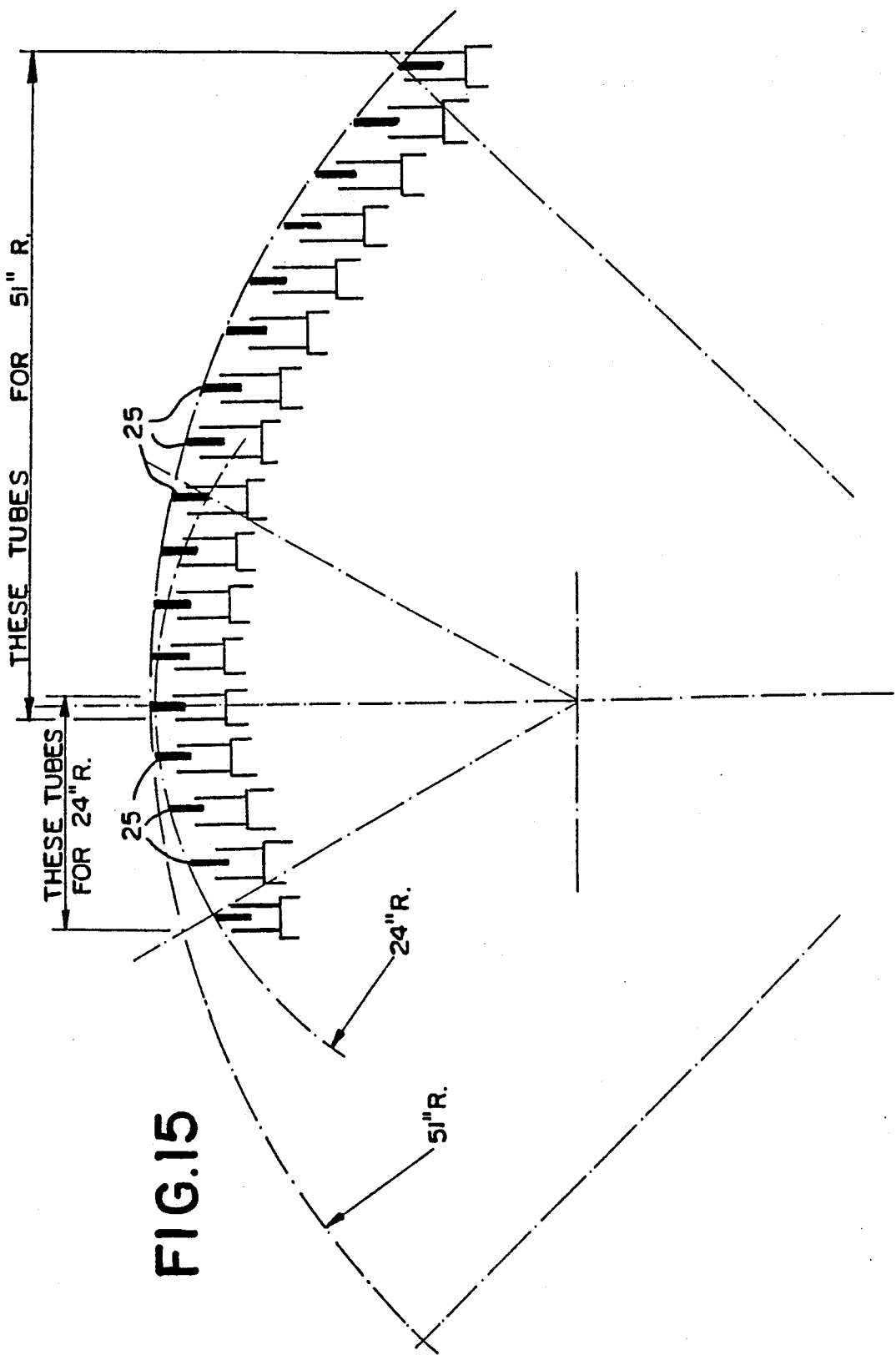

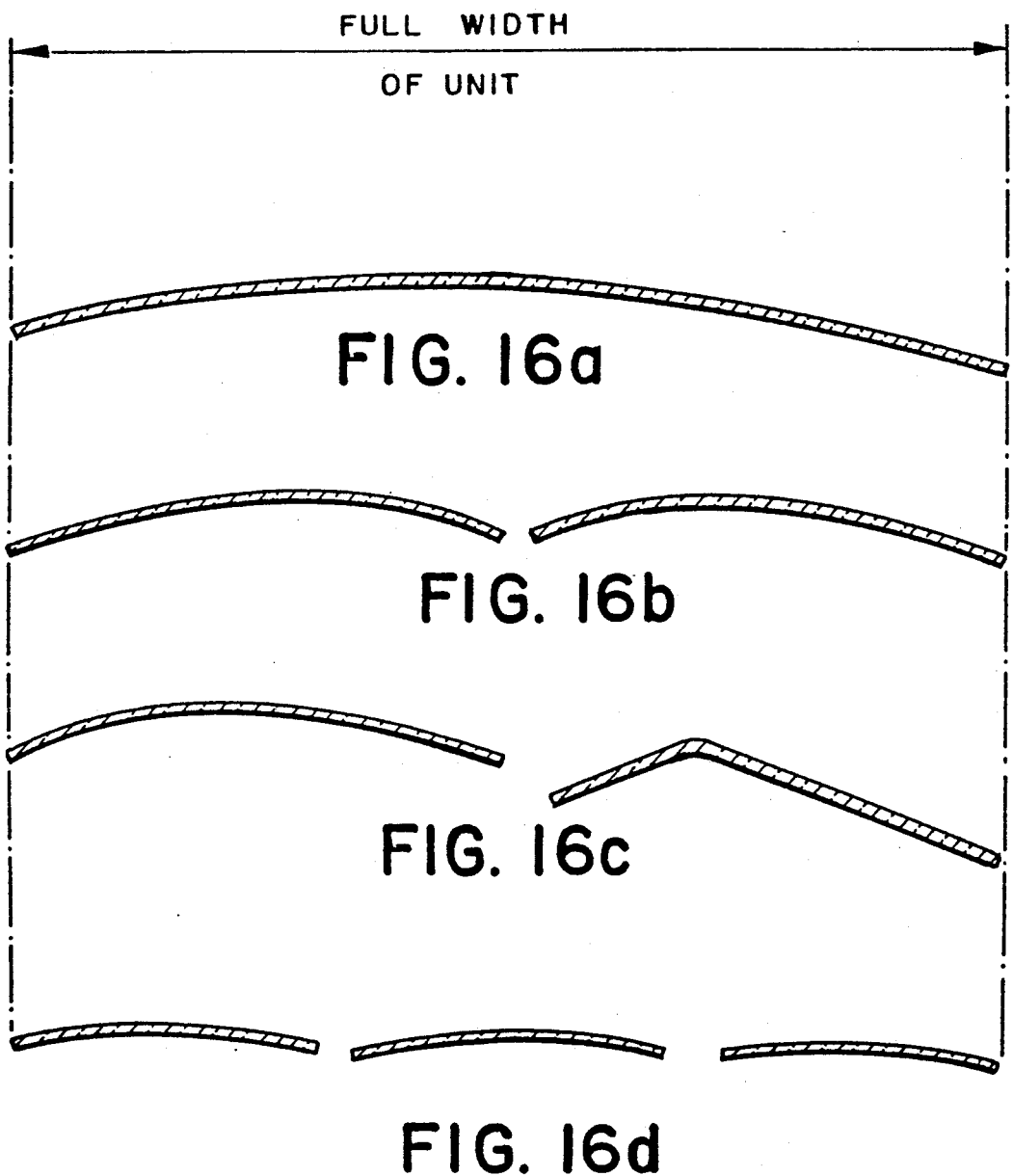

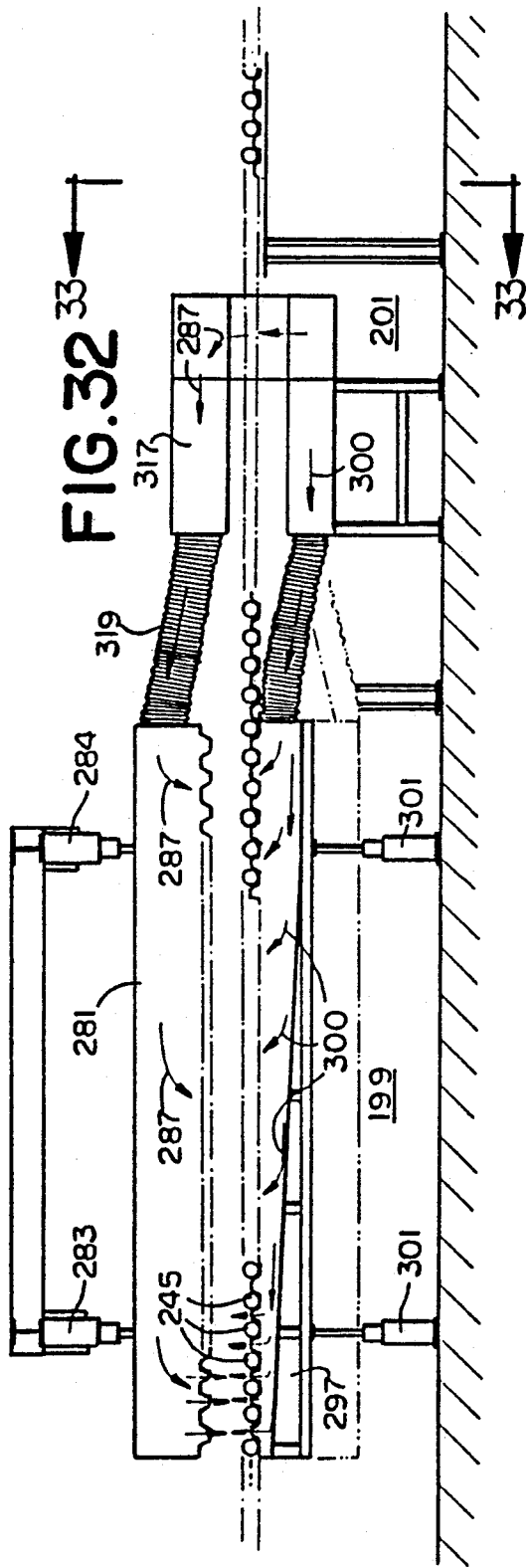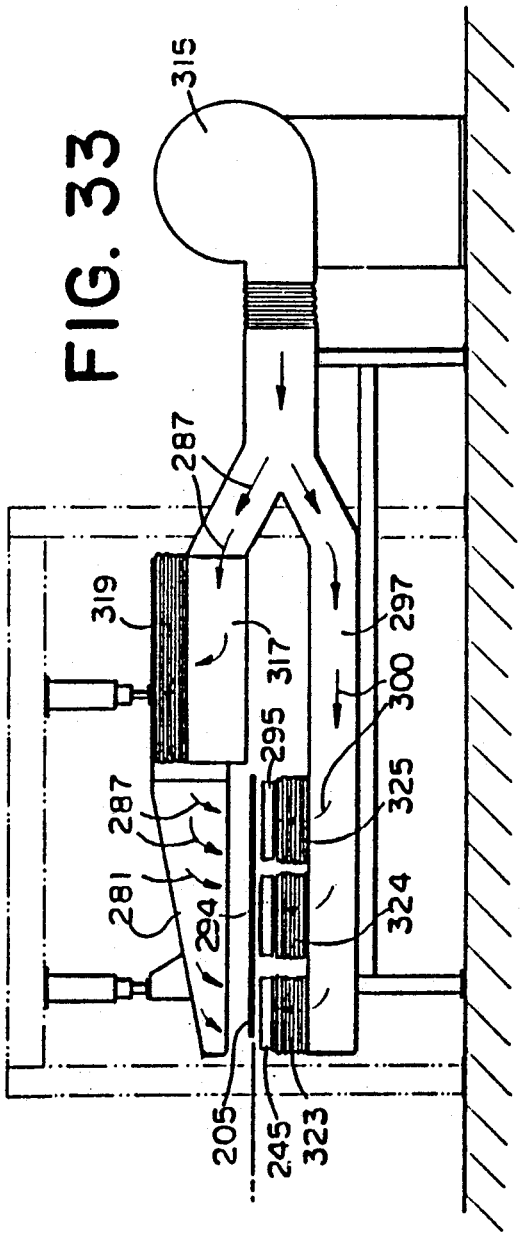

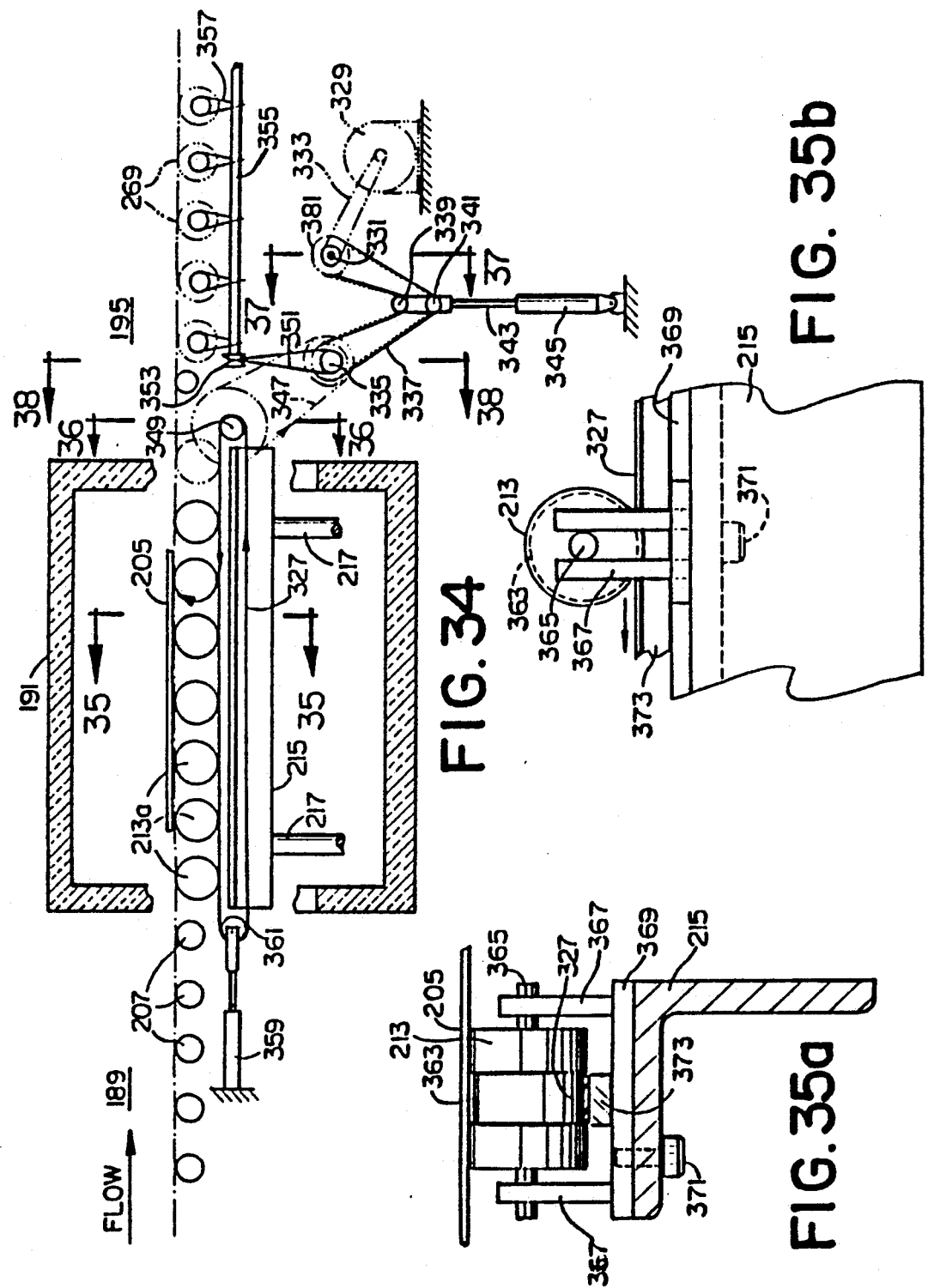

APPARATUS FOR BENDING GLASS

This is a divisional of copending application Ser. No. 07/417,090 filed on Oct. 4, 1989 now U.S. Pat. No. 5,009,693, issued Apr. 23, 1991.

BACKGROUND OF THE INVENTION

1. Field of the Invention

This invention relates to a method and an apparatus for bending and tempering glass sheets, and more particularly concerns bending flat glass sheets into curved glass sheets adapted for use in automobiles as sidelites (side windows) and backlites (back windows) or for use in buildings, by positioning longitudinal rows of disc rollers or mini-rollers to form transverse curved contours which receive a hot flat glass sheet and form it into a desired contour. The longitudinal rows of rollers may be raised and lowered to different controlled vertical elevations to produce glass sheets that are bent into transverse curves as viewed from the unloading end of the machine.

2. Description of the Prior Art

Many techniques for bending glass sheets are known. A simple technique is to support the edge portions of the glass sheet on the edge portions of a horizontally positioned contoured perimeter mold having a depressed center portion, and heat the glass sheet to cause its unsupported center portion to sag by gravity to conform to the shape of the depressed center portion of the mold. This gravity process is slow. It can be speeded-up by pressing the hot glass sheet between a pair of upper and lower contoured molds instead of depending on gravity to bend it, as disclosed by Seymour in U.S. Pat. No. 3,846,104.

U.S. Pat. No. 3,476,540 to Ritter et al. discloses a glass bending arrangement having a single vertically-rising lower bending mold on which the hot glass is bent by gravity. Disadvantageously, the bent glass sheets must pass without edge support along a roller conveyor into a tempering zone.

U.S. Pat. No. 3,600,150 to Rougeux shows a glass bending arrangement where the heat softened glass sheet is slipped from a roller conveyor onto a flexible hammock and thereafter press-bent between upper and lower forming molds. The purpose of the flexible hammock is to support the glass sheet initially out of contact with the rigid shaping mold surfaces. A major reconstruction of the apparatus is required when a change in the glass shape is desired.

U.S. Pat. No. 4,300,935 to Seymour discloses a glass bending arrangement wherein a heat softened glass sheet is elevated by a flat vacuum platen that raises the glass sheet and drops it onto a bending mold to bend it by gravity. After bending the glass, the bending mold carrying the bent glass is passed into a tempering station by a shuttle where the bent glass sheet is tempered.

It has long been desired to provide a method and apparatus for bending large sheets of glass, especially for bending the larger bent lites of glass specified by architects for buildings. The major problem with existing horizontal mold bending equipment is that most use horizontally positioned perimeter molds, which leave unsupported a large area of glass in the center of the glass sheet. The unsupported area of glass may be the subject of uncontrolled sagging when the glass is at the softening point for bending.

Another problem with conventional glass bending machines is their lack of versatility and the high cost of changeovers from one size glass sheet to another. Conventional bending machines do not have the ability to run a small number of a shaped glass sheet of one size and then quickly change to glass sheets of a different shape and size without the loss of valuable production time.

SUMMARY OF THE INVENTION

In accordance with the batch process of the invention, a glass sheet is transferred on rollers from a load conveyor into an oven where it is heated. The glass sheet oscillates back and forth on longitudinal rows of disc or mini-rollers in the oven until it reaches a hot softened condition and is ready for bending. The vertical position of the longitudinal rows of disc rollers is changed to a curved transverse contour of the desired bent glass sheet. The hot glass sheet sags by gravity to conform to the shape of the top surface of the longitudinal rows of rollers, and then is quickly conveyed to a quench section where it is quenched.

The quench section also includes longitudinal rows of disc or mini-rollers that form the same transverse curved contour as the rollers in the oven. Quench air tubes support the quench rollers and also function to direct quenching air to the top and bottom surfaces of the bent glass sheet.

The bent glass sheet is then moved to a cooling section where it is cooled by cool air, and to an unload section where the cooled bent glass sheet is removed from the machine.

BRIEF DESCRIPTION OF THE DRAWINGS

FIG. 1 is a schematic view in top plan of apparatus constructed in accordance with the invention;

FIG. 2 is a side view in vertical section taken as indicated by the lines and arrows 2—2 which appear in FIG. 1;

FIG. 3 is a view in vertical section taken as indicated by the lines and arrows 3—3 which appear in FIG. 2, and especially shows the quench blower apparatus;

FIG. 6 is a view in side elevation taken as indicated by the lines and arrows 6—6 which appear in FIG. 5 and shows the drive sprocket detail for the oven disc rollers;

FIG. 7 is a top plan view taken as indicated by the lines and arrows 7—7 which appear in FIG. 5 and shows the common drive sprocket for the oven disc rollers and the quench disc rollers;

FIG. 8 is a view in side elevation taken as indicated by the lines and arrows 8—8 which appear in FIG. 5 and shows the connection of the DC drive motor to a common drive shaft;

FIG. 15 is a schematic front view in elevation of the radius layout of quench disc rollers in a quench section for glass sheets 80 inches wide and 24 inches wide;

FIGS. 16a-16d are front views in elevation showing examples of different types of glass bends which may be made using the disclosed apparatus;

FIG. 32 is a view in cross-section of the machine of FIG. 24 taken as indicated by the lines and arrows 32—32 which appear in FIG. 24 and shows a final cooling section and an unloading section;

FIG. 33 is a side view in elevation taken as indicated by the lines and arrows 33—33 which appear in FIG. 32;

FIG. 34 is a side view in elevation of the drive mechanism for the oven mini-rolls and the quench rolls;

FIG. 35a is an enlarged view in section taken as indicated by the lines and arrows 35—35 which appear in FIG. 34 and shows a flat glass sheet supported on an oven mini-roll;

FIG. 35b is a side view in elevation of FIG. 35a looking from the right-hand side of FIG. 35a;

DETAILED DESCRIPTION

Figure 4:
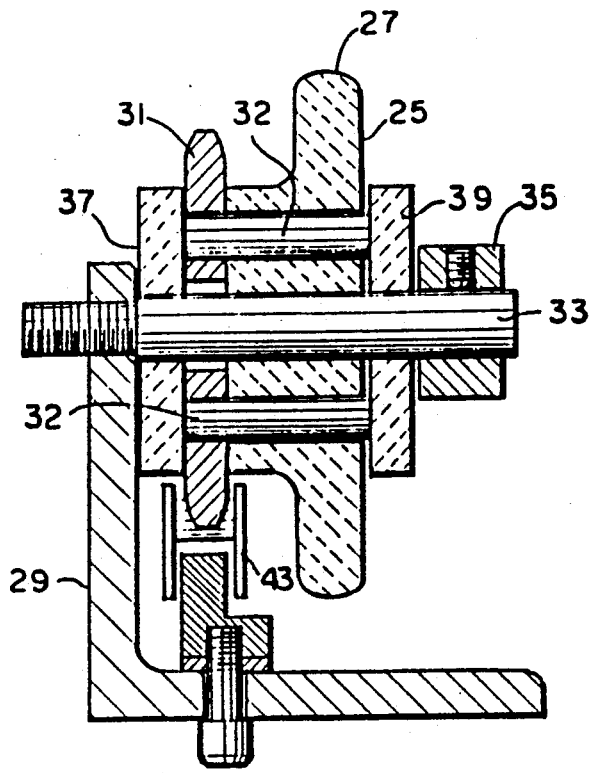
FIG. 4 is a view in vertical section of an oven roller.

Turning now to the drawings, there is shown in FIGS. 1-2 a batch machine or apparatus 11 for bending and tempering glass sheets which includes a load conveyor 13 for transporting a glass sheet 15 to an oven 17 for heating the glass sheet 15 to a hot softened condition, and then to a quench section 19 for quenching the hot bent glass sheet 15. A cooling section 21 is positioned next to quench section 19 for cooling the quenched bent glass sheet 15, and an unload conveyor 22 is next to the quench section 19 for unloading the bent glass sheet 15 after it has cooled. Load conveyor 13, oven 17, quench section 19, cooling section 21 and unload conveyor 22 all lie in a straight line.

Load conveyor roller means, such as load conveyor rollers 23 (FIG. 2), form a part of conveyor 13 and are supported on rotatable shafts that are power driven to rotate and move the flat glass sheet 15 to oven 17. The load conveyor rollers 23 may be full faced rollers, and may be wrapped with Kevlar polyaramide made by duPont so as to protect the glass sheet from being marked by the rotating rollers.

Conveyor means, such as oven rollers 25 (FIG. 2) in the form of discs or mini-rollers are positioned in oven 17 and are arranged in transverse rows (FIG. 9a) in oven 17, on close centers, to distribute evenly the unit loading of glass sheet 15 among the rollers 25 and uniformly support the glass sheet over its surface. Rollers 25 are staggered from row to row to effectively halve the original center distance between rollers 25 to further evenly distribute the load of glass sheet 15.

Disc rollers 25 (FIG. 4) are made of fused silica and have a smooth, rounded glass-contact surface 27.

Oven disc rollers 25 (FIG. 2) are rotatably mounted on bars 29 which extend lengthwise in oven 17. FIG. 4 shows in detail how a roller 25 is connected to a bar 29. Each roller 25 is attached to a sprocket 31 by sprocket pins 32, and is rotatably mounted on a shaft 33 which is attached to one of the bars 29. A set screw collar 35 is mounted on an end of shaft 33 to prevent the roller 25 from slipping off the shaft 33. A first thrust washer 37 is positioned between bar 29 and sprocket 31, and a second thrust washer 39 is positioned between roller 25 and collar 35 so that roller 25 turns easily on shaft 33.

Each line of rollers 25 (FIG. 5) is driven by a tangential chain drive 41 that engages sprockets 31 of rollers 25. Tangential chain drive 41 includes a chain 43, which is driven by a compound sprocket 45. Chain 43 engages compound sprocket 45, the sprocket of roller 25a and sprocket 47, and engages the underside of sprockets 31 of rollers 25 to drive the rollers. Roller 25a is an idler, and is not driven by a sprocket. There is a tangential chain drive 41 for each line of rollers 25.

Figure 5:
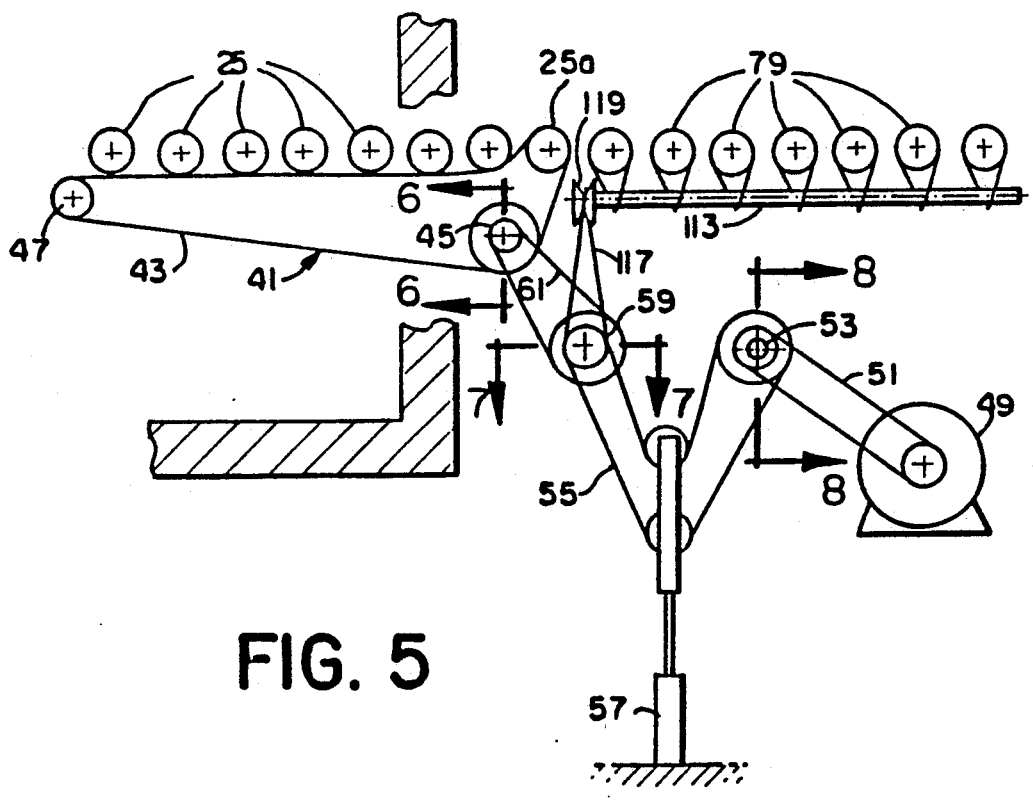
FIG. 5 is a side view in elevation of the drive mechanism for the oven disc rollers and the quench disc rollers of FIG. 2.

The drive mechanism for compound sprocket 45 and the tangential chain drive 41 is shown in FIG. 5. A direct current motor 49 is connected by a chain or belt 51 to a common drive shaft 53 which is connected by a belt 55 to a timing belt sprocket 59 that is connected by chain 61 to drive sprocket 45.

As shown in FIG. 5, main drive shaft 53 drives air loaded timing belts 55, which are kept taut by air actuated pulley mechanisms 57 (FIG. 5). Belts 55 engage timing belt sprocket 59, which drives chains or belts 61 that engage compound sprockets 45 which are mounted on a drive shaft. One compound sprocket 45 is required for each line of rollers 25. FIG. 6 shows how compound sprocket 45 connects to the tangential chain 43 and also to chain 61.

When a flat glass sheet 15 is heated in oven 17 to a hot softened condition, the glass sheet 15 sags and bends (FIGS. 9a-9b) to the desired shape or contour formed by the vertical position of rollers 25.

Turning again to FIG. 2, each longitudinal bar 29 that supports oven rollers 25 is mounted at both ends on actuators 63, which may be air cylinders, or other actuators, with piston rods extending therefrom that raise and lower bar 29 and the discs 25 that each bar 29 supports. Actuators 63 are mechanical, but may be electromechanical or hydraulic, and are tied into a programmable controller which determines the length of stroke of the actuators 63 and causes bars 29 to be raised and lowered in synchronization.

Figure 9A:
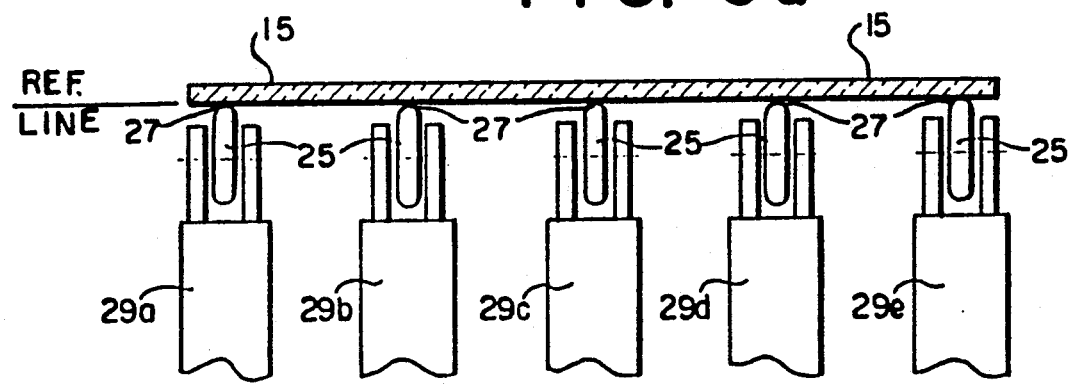
FIG. 9a shows a front view in elevation of a glass sheet on the oven rollers before the bending operation takes place.

As shown in FIG. 9a, when flat glass sheet 15 enters oven 17, the oven disc rollers 25 are coplanar. When the glass sheet 15 is heated and ready to be bent, the controller moves the actuator to the desired positions of FIG. 9b so that bars 29a-e and rollers 25 (FIG. 9b) set the mold contour of roller contact surfaces 27 across the width of oven 17. The hot glass sheet 15 sags and conforms to the contour of the contact surfaces 27 of rollers 25.

Figure 9B:
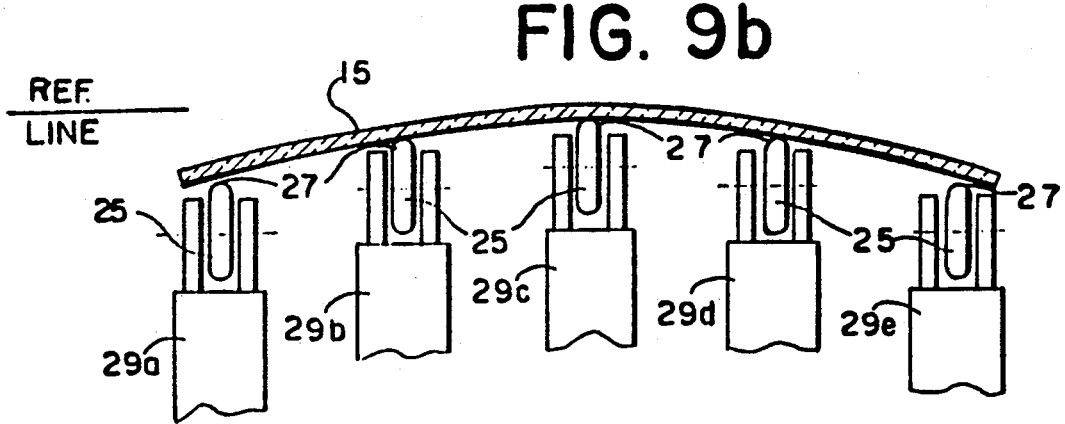
FIG. 9b shows the position of the oven rollers after the glass sheet is bent into a convex curve.

In FIG. 9b, glass sheet 15 is bent into a convex shape by maintaining central bar 29c at its original vertical position, dropping bars 29b and 29d below central bar 29c, and dropping bars 29a and 29e below bars 29b, 29d.

FIG. 9b shows the position of bars 29a-29e for bending glass sheet 15 into a convex shape, but bars 29a-29e may instead be positioned to bend glass into a concave shape, or other shapes that may be achieved by positioning bars 29a-29e at various vertical locations to form different contours across the width of oven 17. Further, bars 29 may be positioned as a single radius of curvature for a wide, single lite of glass, or as a series of radii for a group of small lites of glass, as shown in FIGS. 16a-16d.

Figure 14A:
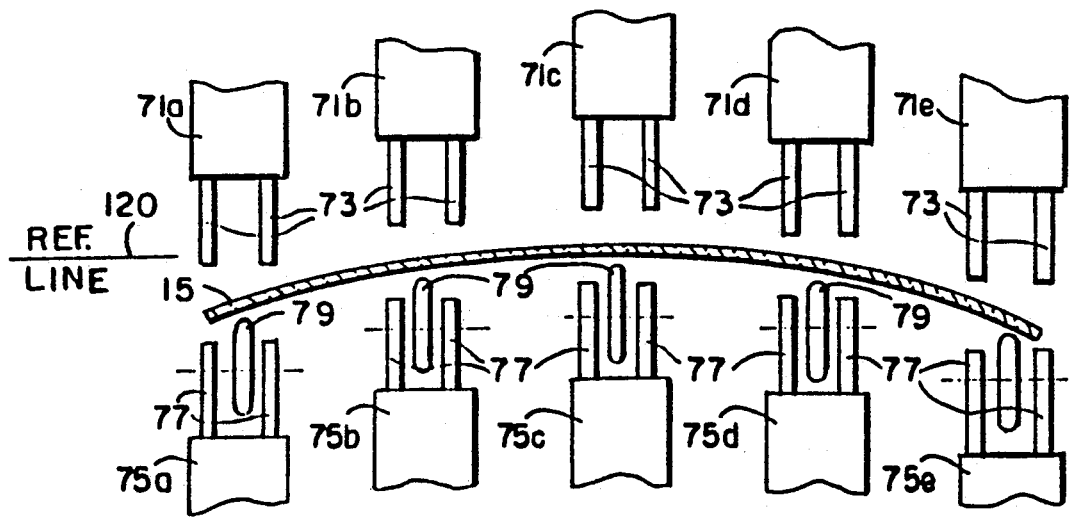
FIGS. 14a-14b illustrate the sequential steps of raising a quenched bent glass sheet from below a reference line to above the reference line for transport from the quench to the cooling section.

Quench section 19 (FIG. 2) includes upper quench ducts 71 having downwardly extending air distribution tubes 73 and lower quench ducts 75 having upwardly extending air distribution tubes 77 (FIG. 14a).

Figure 12:
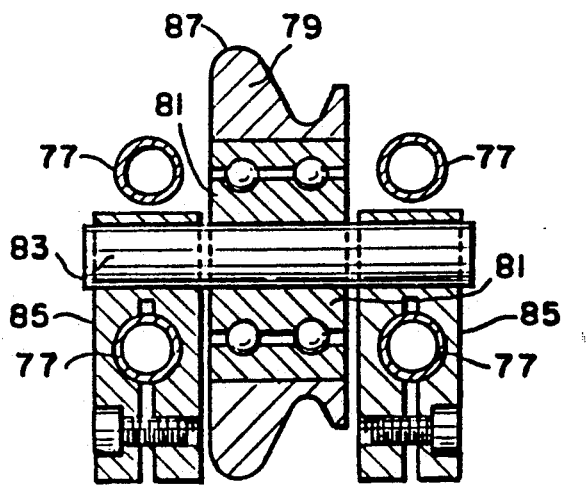
FIG. 12 is a view in horizontal cross section of a quench drive roller of FIG. 2.
Figure 10:
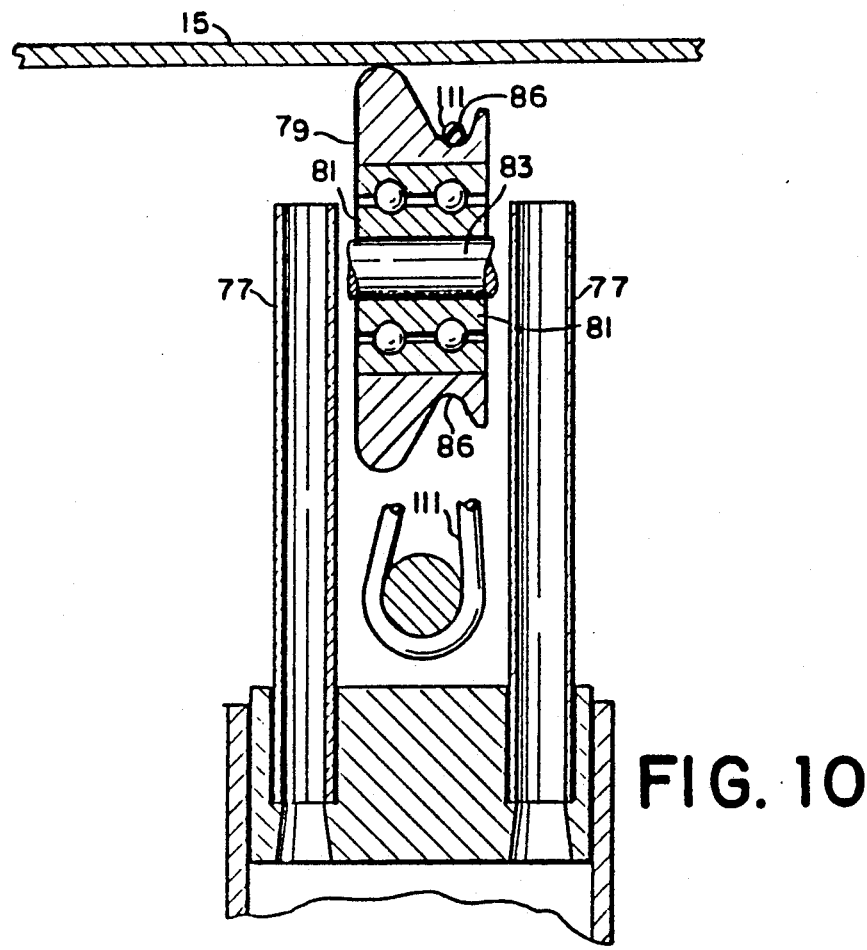
FIG. 10 is a side view in vertical cross section of a quench disc roller of FIG. 2.

Quench section 19 includes quench rollers 79, which are mounted (FIG. 10) between lower quench tubes 77 on duplex bearings 81 which rotate around an axle or shaft 83. Axle 83 (as shown in the horizontal section of FIG. 12) is secured at both ends by split clamp support blocks 85 mounted on vertical tubes 77. Since rollers 79 are mounted on tubes 77, rollers 79 always follow the contour set by the tops of tubes 79. Rollers 79 are made of G-7 phenolic or Kevlar polyaramide, made by DuPont, and have a smooth, round contact face 87. Kevlar is a registered trademark of E. I. DuPont de Nemours & Co., Inc.

Figure 13:
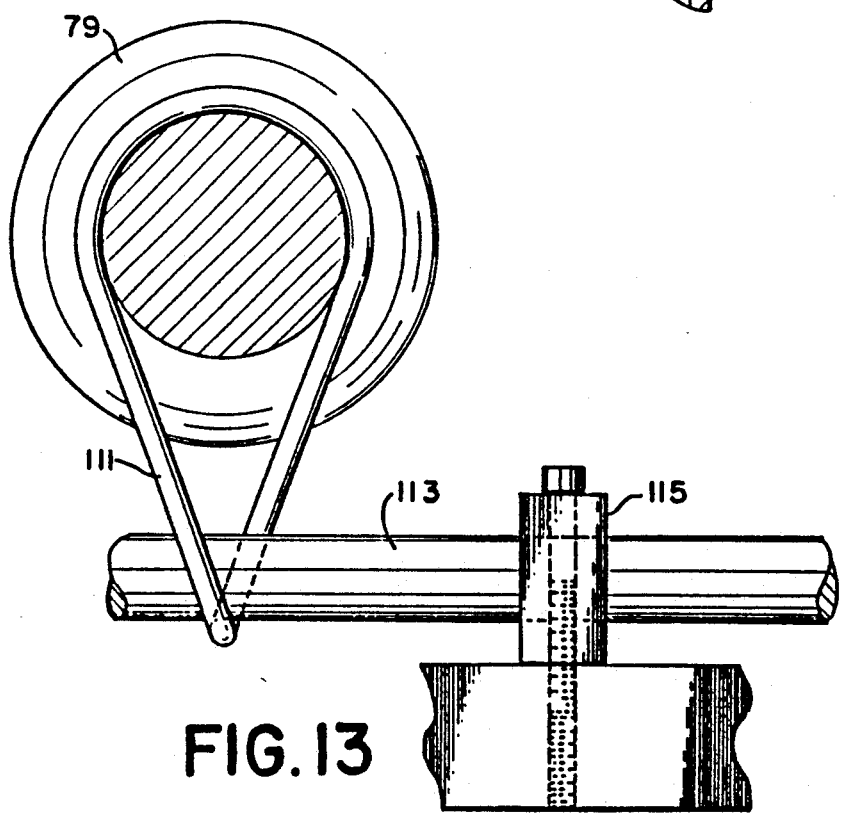
FIG. 13 is a side view in elevation of the connection between a quench drive roller and its drive shaft of FIG. 2.

Rollers 79 (FIG. 13) are driven by a line shaft 113, and flexible O-ring belts 111 which engage a circumferential groove 86 (FIG. 10) in rollers 79. Each belt 111 is twisted 90 degrees when it engages groove 86 and shaft 113 because the direction of rotation of rollers 79 is at a 90-degree angle to the direction of rotation of shaft 113.

Shaft 113 (FIG. 13) is mounted on Teflon synthetic resin bearings 115 which are located every nine inches along the full length of shaft 113.

Shaft 113 and rollers 79 (FIG. 5), like rollers 25, are driven by motor 49. Timing belt sprocket 59 (FIG. 5 and FIG. 7), which drives chain 61 and compound sprocket 45, simultaneously drives a belt 117 that is twisted 90 degrees to engage and drive a sprocket 119 which is fixedly mounted on shaft 113. Rollers 25 and 79, when actuated, rotate at the same speed because they both are driven by timing belt sprocket 59.

Rollers 79 (FIG. 11) are arranged in lines that extend lengthwise through quench 19, on close centers, to distribute evenly the unit loading of glass sheet 15 among rollers 79. Rollers 79 are also staggered (FIG. 11) to further distribute the loading of glass sheet 15 on the rollers 79.

Each longitudinal row of rollers 79 (FIG. 14a) and tubes 77 are mounted on a lower quench duct 75 which extends the full length of the quench section 19. Similarly, each longitudinal row of tubes 73 is mounted on an upper quench duct 71 which extends the full length of the quench section 19.

Lower ducts 75 (FIG. 2) are connected to lower quench actuators 105 which raise and lower the ducts 75 to a desired height. Upper ducts 71 are connected at both ends to upper quench actuators 107 that are mounted on a quench frame 109 and which raise and lower the ducts 71 to a desired height. Actuators 105, 107 are mechanical, but may be electromechanical or hydraulic, and are tied into the same programmable controller that controls actuator 63, to determine the length of stroke of actuators 105, 107 and cause ducts 71, 75 and bars 29 to be raised and lowered in synchronization.

Tubes 73, 77 are provided with quenching air from a quench blower 92 (FIG. 3), with air from blower 92 going to tubes 73 from a top chamber 93 and air going to the tubes 77 from a bottom chamber 95. A flexible connecting duct 99 (FIG. 2) connects bottom chamber 95 to duct 75, and a flexible connecting duct 101 connects chamber 93 to duct 71. Connecting ducts 99, 101, are flexible to supply air to ducts 71, 75 in their raised and lowered positions.

Figure 11:
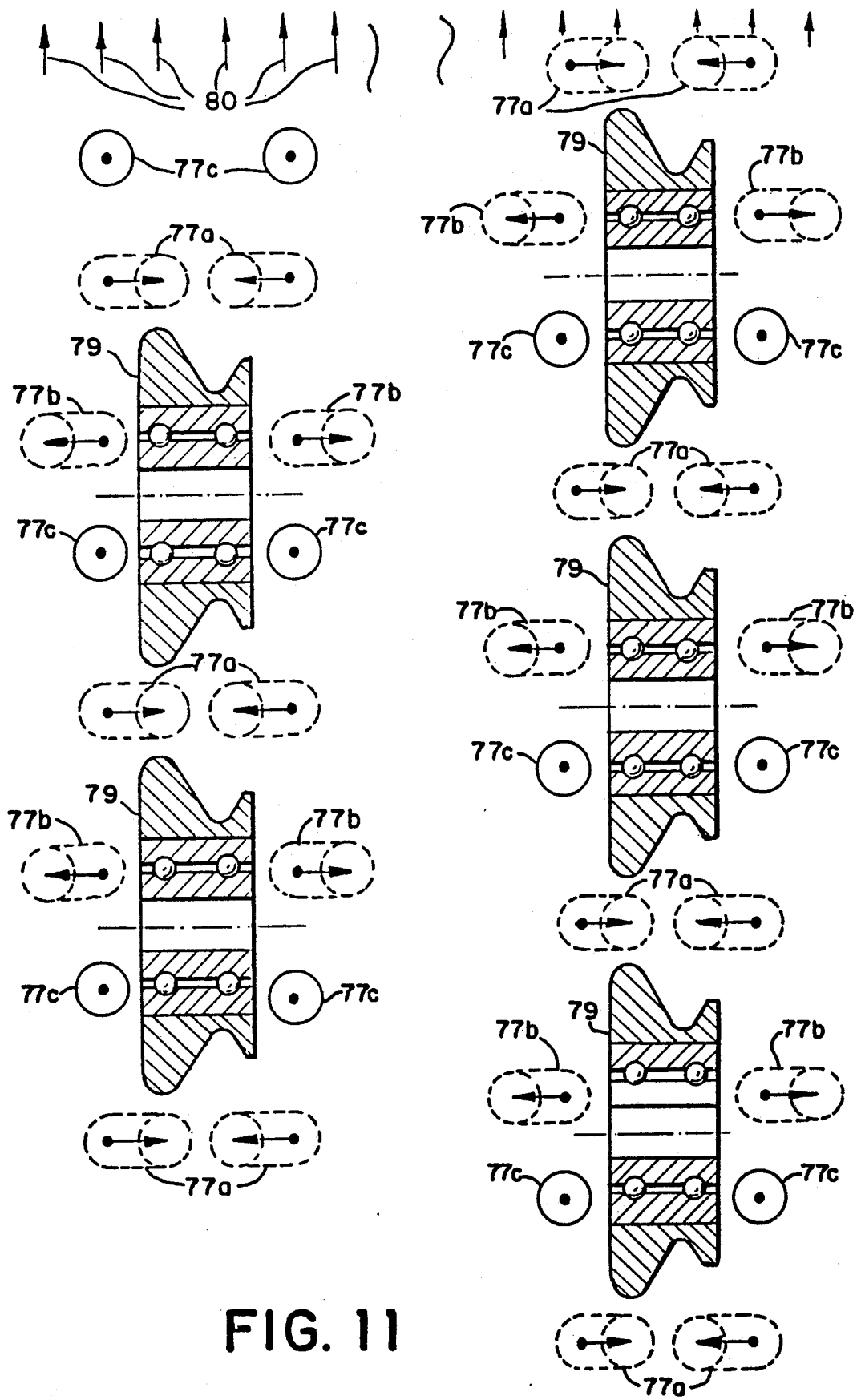
FIG. 11 is a section view of the top plan layout of bottom quench tubes in the quench section.

The distribution of tubes 77 on lower quench ducts 75 is best seen in FIG. 11. The tubes 77 in each line are grouped in pairs in one of three configurations: angled-inwardly, angled-outwardly or vertical. Angled-inwardly tubes 77a are located between longitudinally adjacent rollers 79. Angled outwardly tubes 77b are positioned on both sides of rollers 79, approximately one-third of the distance between longitudinal pairs of tubes 77a. Vertical tubes 77c, which support rollers 79, are positioned on both sides of rollers 79 between tubes 77b and tubes 77a.

The arrows 80 at the top of FIG. 11 indicate the air from tubes 77a-77c impinges uniformly across the surface of the glass sheet as it oscillates on rollers 79 during the quench. Glass sheet 15 is quenched evenly because air from each of the three different types of tubes 77a-c contacts the surface of the glass sheet 15 across its width.

Figure 14B:
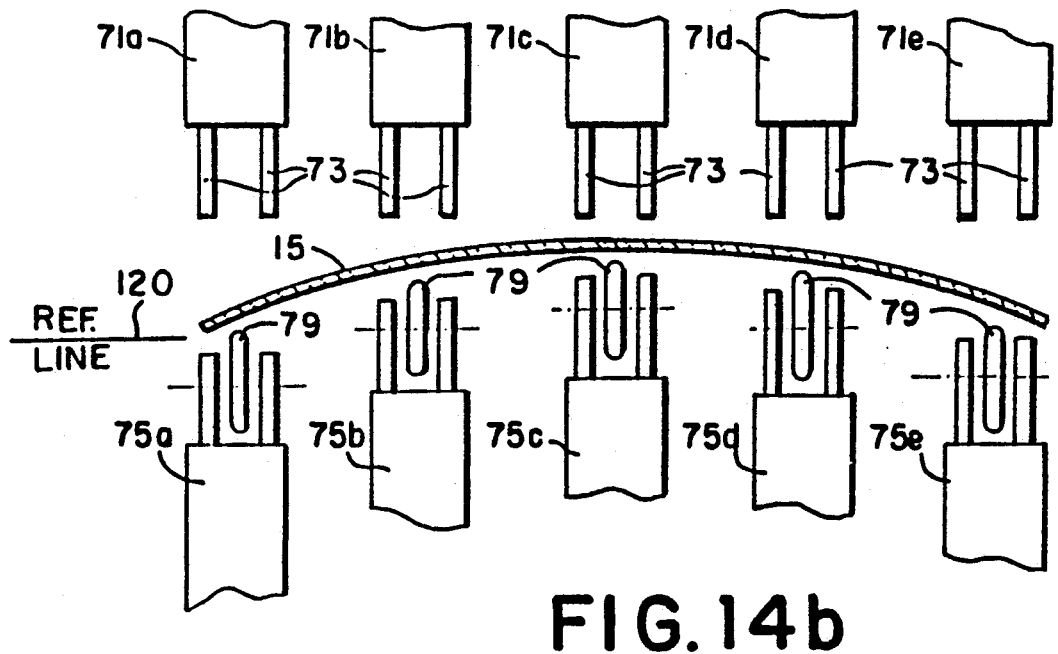

Returning now to the oven 17 in FIG. 2, rollers 25 in oven 17 continue to oscillate until glass sheet 15 conforms to the curved contour formed by the rollers 25. After glass sheet 15 has been bent to the desired shape (FIG. 9b), rollers 25 stop oscillating, and rotate in one direction to rapidly convey glass sheet 15 into quench section 19 and onto quench rollers 79. Since actuators 63, 105 and 107 (FIG. 2) are controlled by the same programmable controller, the contour of quench ducts 71, 75 in quench section 19 conforms to the contour of bars 29 and rollers 25 in oven 17. Therefore, when bent glass sheet 15 (FIG. 14a) enters quench section 19, quench ducts 71, 75 conform to the shape of the glass sheet 15 so that sheet 15 is quenched in its bent shape. FIG. 14a shows that when glass sheet 15 is bent into a convex shape, lower ducts 75a-75e have the same contours as bars 29a-29e and rollers 25 (FIG. 9a). Top bars 71a-71e are lowered (FIGS. 14a-14b) to be close to the surface of glass 15, and air from blower 92 passe through chambers 93, 95 (FIG. 3) and tubes 73, 77 and quenches glass sheet 15.

During the quenching step, as shown in FIG. 14a, glass sheet 15 is below a reference line 120 which indicates the height of the glass sheet 15 when it enters oven 17 before it is bent. When the glass sheet 15 is bent, it is dropped below this reference line 120, and then transported to quench section 19. When the quenching is finished, ducts 71 are returned to their initial positions and glass sheet 15 is raised on ducts 75 and rollers 79 (FIG. 14b) so sheet 15 is at the same height as load conveyor 21.

Bent glass sheet 15 is moved from oven 17 to cooling section 21, where the quenched glass sheet 15 is cooled.

Rollers 121 (FIG. 2) in the cooling section transport glass sheet 15 between upper cooling duct 123 and lower cooling duct 125. Cooling ducts 123, 125, which are provided with cooling air by a cooling blower, have low pressure air distribution ducts which distribute cool air onto the glass to cool it. Upper cooling duct 121 is adjustable so it may be raised and lowered to adjust to the depth of bend of glass sheet 15 to allow it to pass through cooling section 21 unrestricted.

Unload conveyor section 22 includes rollers 129 that transport the cooled and quenched bent glass sheet 15 from cooling section 21 for removal.

FIG. 15 shows that about 9 oven rollers 25 are required for bending a 24 inch wide sheet of glass and that about 25 oven rollers 25 are required for bending an 80 inch wide sheet of glass.

Examples of the different types of glass bends which may be made using apparatus 11 are shown in FIGS. 16a-16d. FIG. 16a shows a single wide lite of bent glass which is bent using the full width of the bending unit. FIG. 16b shows two lites of glass bent to the same contour with each lite bent across approximately one-half the width of the unit.

FIG. 16c shows two lites of glass with different contours bent across one-half the width of the unit.

FIG. 16d shows multiple lites bent across the width of oven 17.

Figure 17:
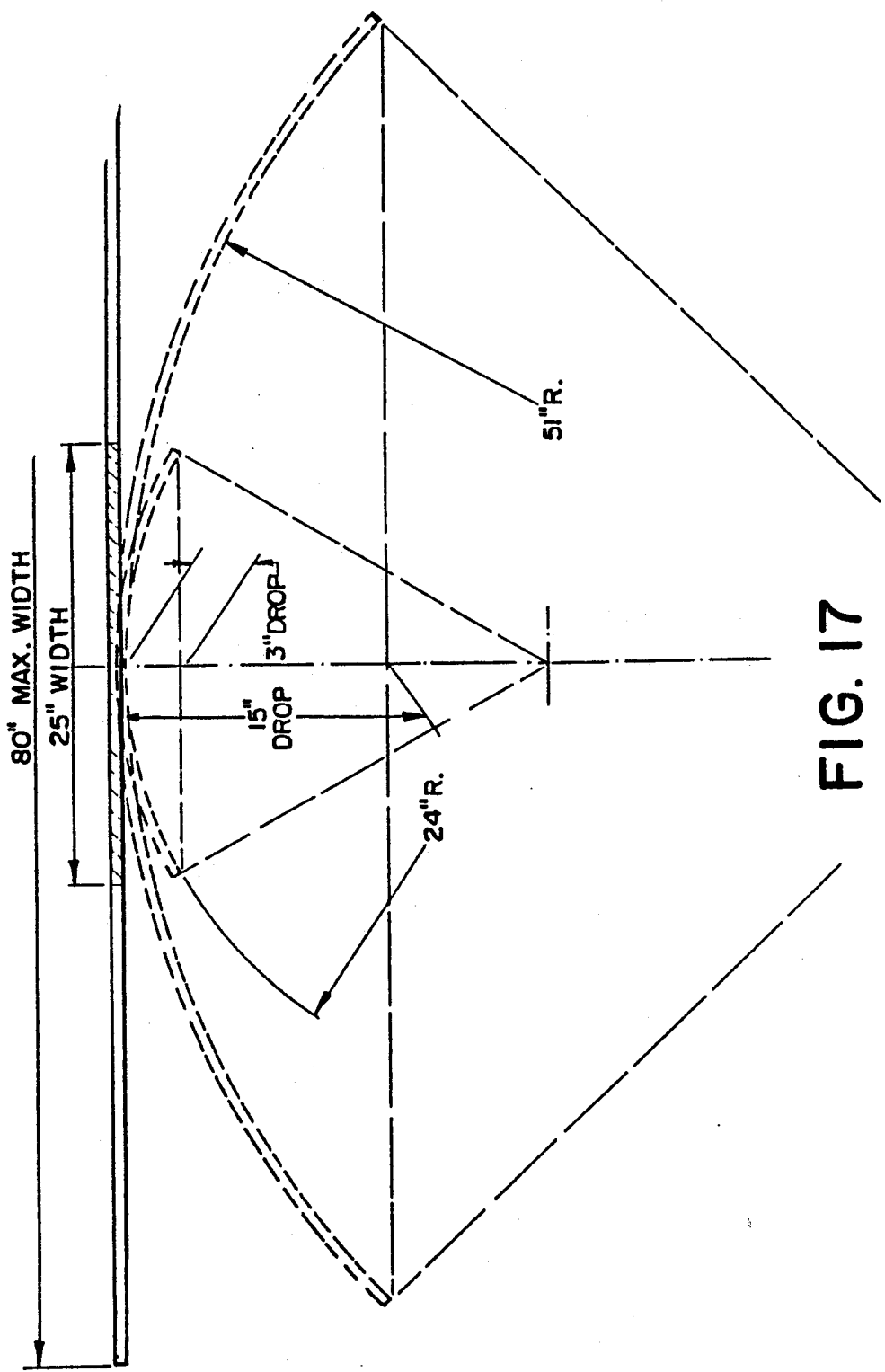
FIG. 17 is a front view in elevation of various widths and radii of glass sheets which may be bent in the inventive apparatus.

The minimum and maximum parameters for bending glass sheets in oven 17 are shown in FIG. 17. The minimum width of glass sheet 15 which may be bent in oven 17 is about 25 inches, and the maximum width of glass sheet 15 is about 80 inches.

In operation, a flat glass sheet 15 (FIG. 2) is placed on load conveyor rollers 23 in load conveyor section 13. Glass sheet 15 is moved on rollers 23 onto oven disc rollers 25 and then onto quench rollers 79. Oven disc rollers 25 and quench rollers 79 rotate at the same speed, and are driven (FIG. 5) by DC motor 49.

When glass sheet 15 reaches a desired location in oven 17, rollers 25 stop simply rotating and begin oscillating back and forth as the sheet 15 is heated (FIG. 9a). When glass sheet 15 is hot enough to be bent, actuators 63 (FIG. 2) change the vertical position of bars 29 (FIG. 9b) to a desired contour, and sheet 15 sags by gravity onto rollers 25 to produce a desired curvature of glass sheet 15. At the same time that the oven actuators 63 move bars 29, the lower quench actuators 105 (FIG. 2) change the vertical position of lower quench ducts 75 (FIG. 14a) to the same contour as bars 29, and the upper quench actuators 107 (FIG. 2) change the vertical position of the upper quench ducts 71 (FIG. 14a) until upper ducts 71 are close to lower ducts 75.

While glass sheet 15 is sagging (FIG. 9b) onto rollers 25, sheet 15 continues to oscillate back and forth in the longitudinal direction. When the bending is complete, oven disc rollers 25 (FIG. 2) stop oscillating, and rotate in one direction to rapidly convey bent glass sheet 15 into the quench section 19 and onto quench disc rollers 79. The glass sheet 15 stops in quench section 19, and oscillates back and forth on rollers 79 as quenching air from blower 92 flows (FIG. 14a) through top quench tubes 73 and bottom quench tubes 77 and blows onto hot bent glass sheet 15 to quench the glass.

After glass sheet 15 is quenched, quench ducts 75, rollers 79, (FIG. 14a) and glass sheet 15 rise to the plane 121 of rollers in cooling section 21 (FIG. 14b), and rollers 79 rotate and move glass sheet 15 onto cooling section rollers 121 and into cooling section 21 where cooling air cools the bent glass sheet. Glass sheet 15 moves from cooling section 21 into unload conveyor section 22 and onto unload conveyor rollers 129, where the bent glass sheet 15 is removed.

Quench ducts 75 and bars 29 may return to their normal, flat contour after glass sheet 15 leaves quench section 19 or they may retain their curved contour, or the appropriate contour for the next glass sheet 15 until the run has been completed.

Flat glass sheets may be tempered in apparatus 11 by maintaining a flat contour of rollers 25, 79 throughout the tempering process.

Flat glass sheets 15 from ⅛ to ¼ of an inch thick may be bent in apparatus 11. Flat glass sheets from ⅛ to ½ of an inch thick may be tempered in apparatus 11.

A distinct advantage of apparatus 11 is its ability to run different configurations of glass bends or multiple configurations of glass bends by merely programming the drop of the oven rollers 25 differently and the quench rollers 79 to correspond.

Apparatus 11 as described is a "single zone" in-line system, that is, it includes a single oven 17.

Figure 18:
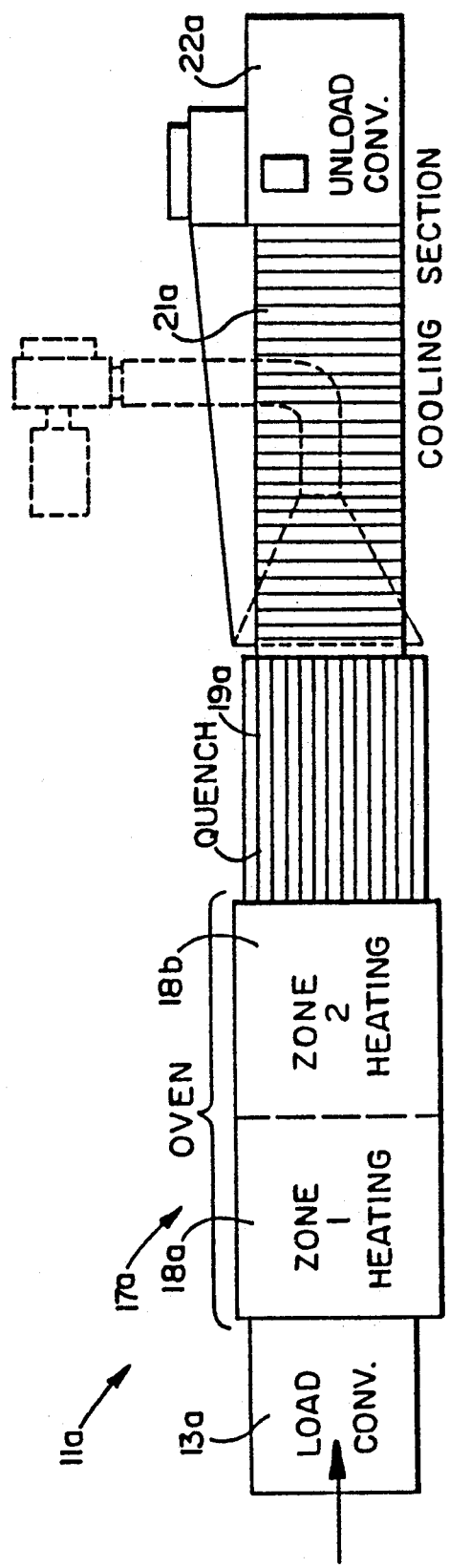
FIG. 18 is a schematic view in top plan of another embodiment of the invention, which embodiment has two heating zones.

The invention may also be used a part of a two-zone in line system, as shown in FIG. 18. Apparatus 11a of FIG. 18 is similar to apparatus 11 of FIG. 1, and includes a load conveyor 13a, an oven 17a, a quench section 19a, a cooling section 21a and an unload conveyor 22a, all of which lie in a straight line.

Apparatus 11a differs from apparatus 11 because oven 17a is divided into two zones 18a, 18b. Zone 18a includes full-face rollers, which are the conventional rollers for bending glass units. The glass sheet is heated to a hot, softened condition in zone 18a, and transported from the full-face rollers to disc rollers in zone 18b. The disc rollers in zone 18b are the same as oven disc rollers 25 of oven 17 of apparatus 11. The glass sheet is bent in zone 18b and then quenched and cooled in the same manner as was described for apparatus 11.

Figure 20:
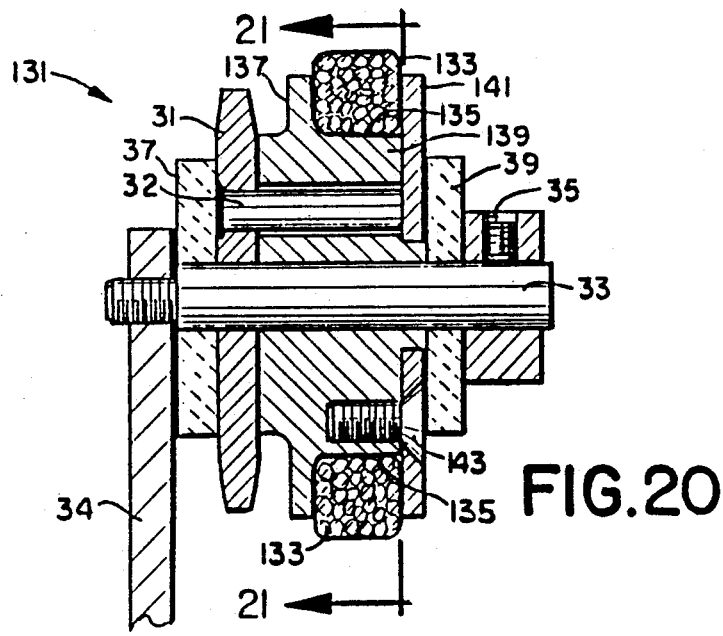
FIG. 20 is a view in elevation of another embodiment of an oven roller.
Figure 21:
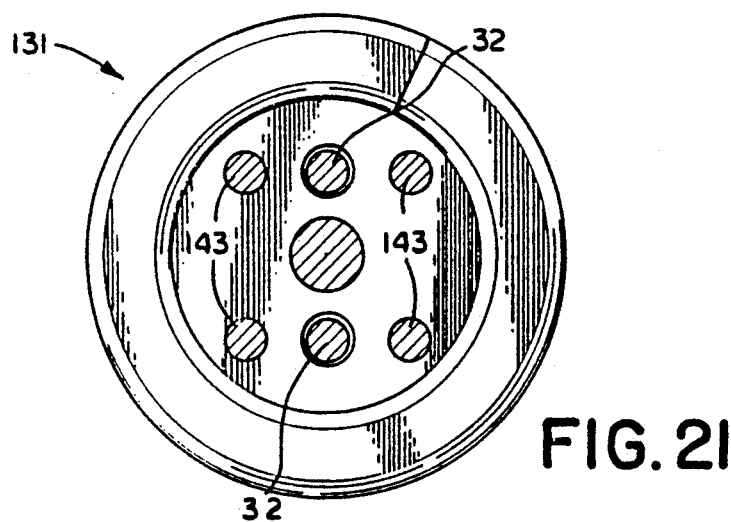
FIG. 21 is a view in vertical section of the oven roller taken as indicated by the lines and arrows 21—21 which appear in FIG. 20.

Other rollers may be used in place of ceramic oven rollers 25. FIGS. 20, 21 show a stainless steel disc roller 131 having a ceramic braided rope 133 wrapped around roller 131 and disposed in a circumferental channel 135. Channel 135 is formed by a base ring 137 which has a hub 139, and a clamp plate 141. Rope 133 is wrapped around hub 139, and clamp plate 141 is tightened against ring 137 by screws 143 (FIGS. 20, 21).

Similar to oven rollers 25, each stainless steel roller 131 is attached to a sprocket 31 by sprocket pins 32 (FIGS. 20, 21), and is mounted on an axle or shaft 33 which is supported by a mounting bracket 34.

A set screw collar 35 is attached to the end of shaft 33, and thrust washers 37, 39 are located one on each side of roller 131 so roller 131 turns easily.

The ceramic rope 133 provides a soft surface for a glass sheet to rest on, and prevents marking or scuffing the glass as it is moved on rollers 131.

Figure 22:
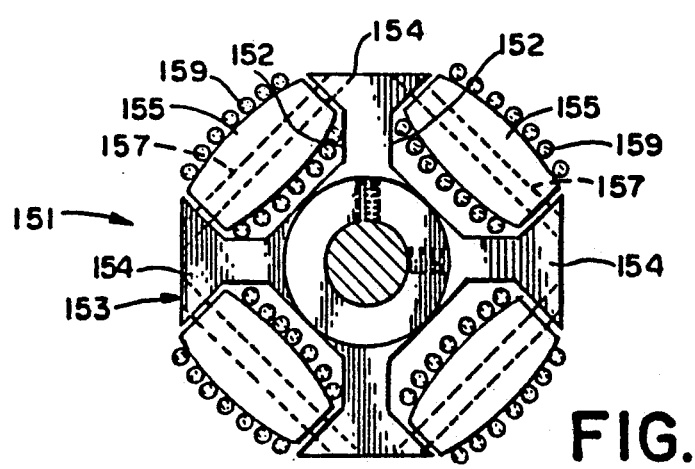
FIG. 22 is a view in elevation of another embodiment of an oven roller viewed from the side of the roller.

Another type of roller which may be used in apparatus 11 is multidirectional barrel roller 151, shown in FIG. 22, which eliminates scuffing caused by sliding action of a glass sheet on a roller.

Roller 151 includes a main roller 153 having four spokes 154 with chambers 152 formed between spokes 154 and located around the circumference of roller 151. A freely rotatable stainless steel barrel 155 mounted on an axle 157 is positioned between each pair of spokes 154 in a chamber 152. Ceramic rope 159 is wrapped around each barrel 155 to provide a soft surface for a glass sheet to rest against.

When used in oven 17 in the glass bending operation of FIG. 2, rollers 151 are driven in one direction to bring a glass sheet into oven 17, and oscillate back and forth as the glass sheet is heated. The ceramic rope 159 prevents roller 151 from scuffing or marking the glass.

When the transverse contour of the bed of rollers 151 is changed to allow the hot glass to bend, the glass may slide sideways across the top of rollers 151. Since barrels 155 are fully rotatable around axle 157 transversely to the rotation of rollers 151, the sagging glass rotates barrels 155 so they do not scuff the bending glass.

In a concave bend, for example, the inner longitudinal rows of rollers 151 are gradually lowered while the outer longitudinal rows of rollers 151 remain in place. When this happens, the glass sheet is temporarily supported by only the two outer longitudinal rows of rollers 151. As the glass sheet sags, its outer edges move towards the center of oven 17 and away from the two outer lines of rollers 151. Barrels 155 rotate in the direction of movement of the glass and the ceramic rope 159 prevents scuffing of the glass.

Figure 19:
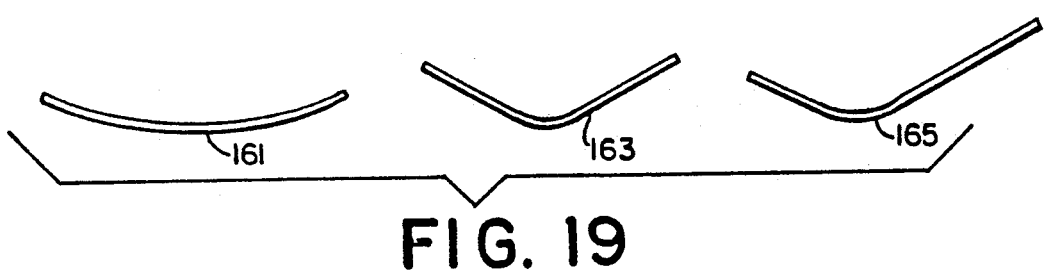
FIG. 19 shows variations in bends of glass sheets or lites as viewed when looking upstream from the discharge end of glass flow.
Figure 23:
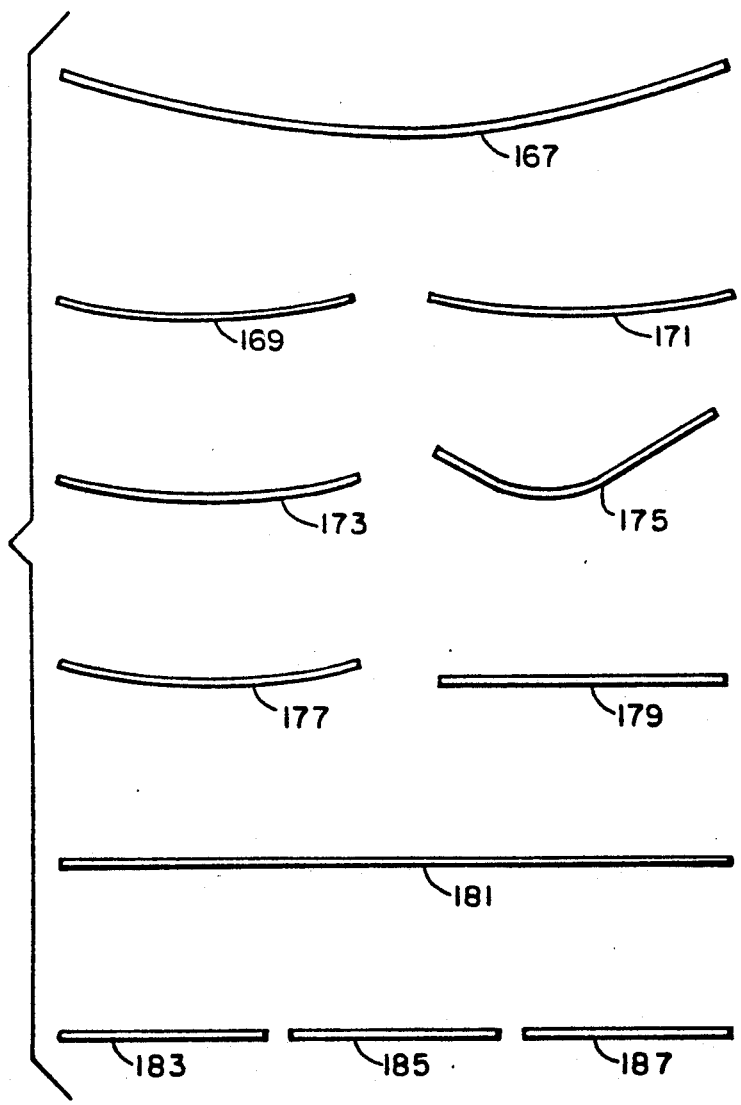
FIG. 23 shows variations in bends of glass sheets or lites as viewed when looking upstream from the discharge end of glass flow.

Turning again to the drawings, FIG. 19 shows variations in bends of glass sheets or lites as viewed when looking upstream from the discharge end of glass flow, with glass sheet 161 being gently curved, glass sheet 163 being curved in the form of a V, and glass sheet 165 being curved in the form of a J, or a lazy J. In FIG. 23, other variations of glass bending are shown, again with the view facing the oncoming glass from the discharge end of the glass flow, with glass sheet 167 being a large, single, bent lite; glass sheets 169 and 171 being multiple-bent lites, which are similar in curvature; glass sheets 173 and 175 being multiple-bent lites of different shapes with glass sheet 173 being a gentle curve and glass sheet 175 being in the form of a lazy J; glass sheets 177 and 179 illustrating multiple lites with sheet 177 being bent into a gentle curve and glass sheet 179 being flat; glass sheet 181 being a large, single, flat tempered glass sheet; and glass sheets 183, 185 and 187 being multiple flat lites.

Figure 24:
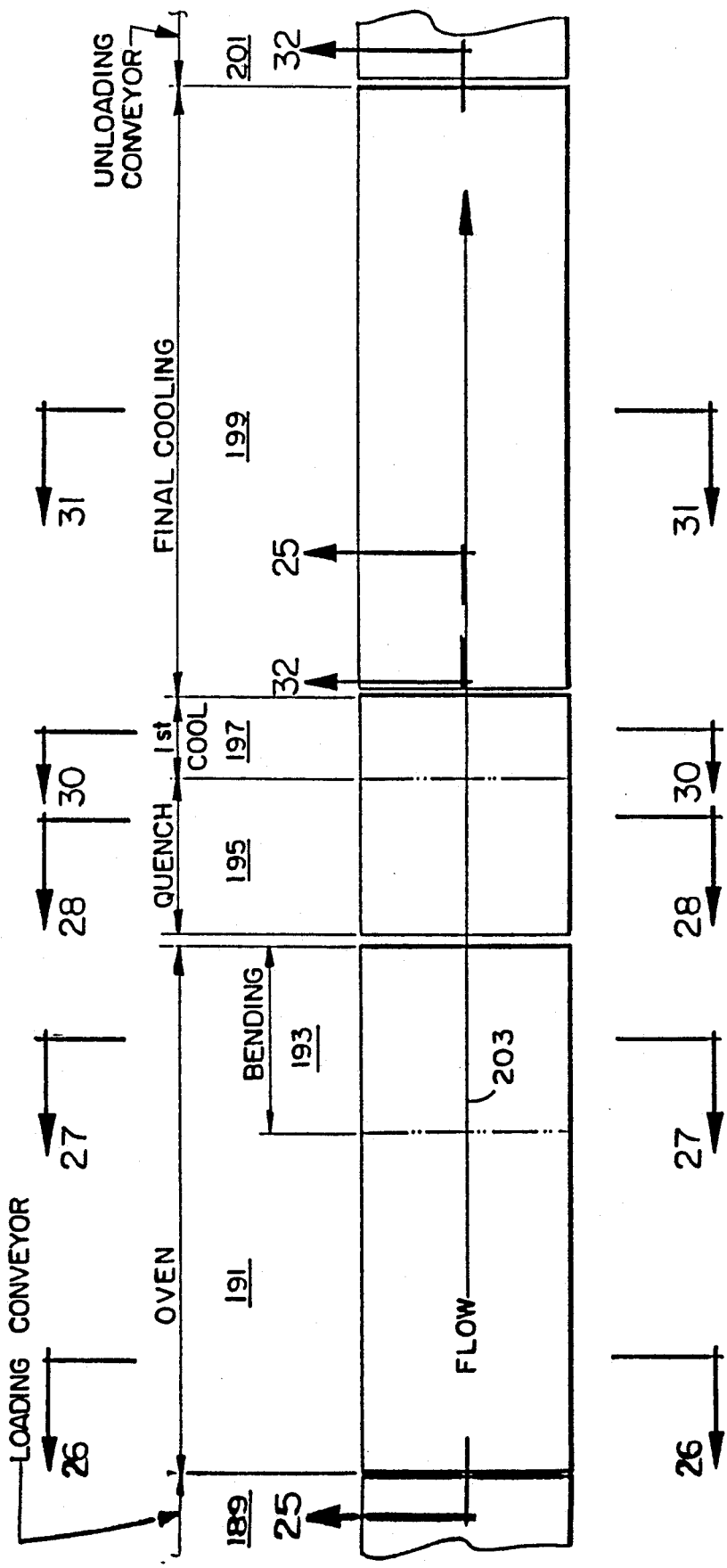
FIG. 24 is a top plan view of a continuous bending and tempering apparatus for bent and flat glass.

FIG. 24 shows the in-line, general arrangement in top plan view of the major sections of a continuous method and apparatus for making a bent glass sheet having a loading conveyor section 189 that conveys the glass sheets to an oven 191 which has a bending section 193 contained therein, a quench section 195 and first cooling section 197, a final cooling section 199, and an unloading conveyor section 201. The flow of glass through the machine is as indicated by the line and arrow 203.

In a batch bending machine, the bending section may occupy the entire oven, whereas in the continuous machine the bending section 193 occupies only a portion of the oven 191.

Figure 25:
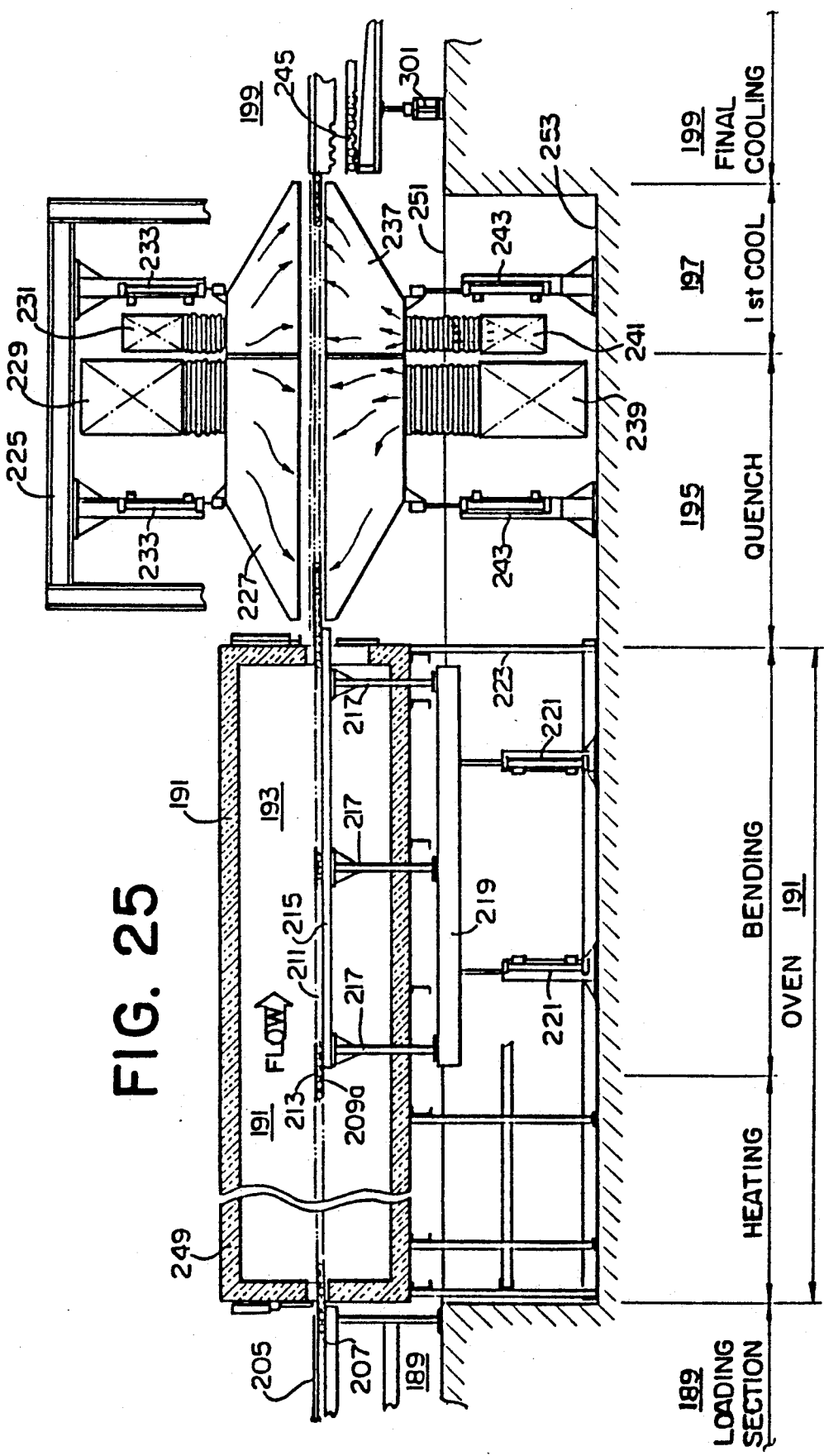
FIG. 25 is a view in longitudinal cross-section of the machine of FIG. 24 taken on the centerline of the machine as indicated by the lines and arrows 25—25.
Figure 26:
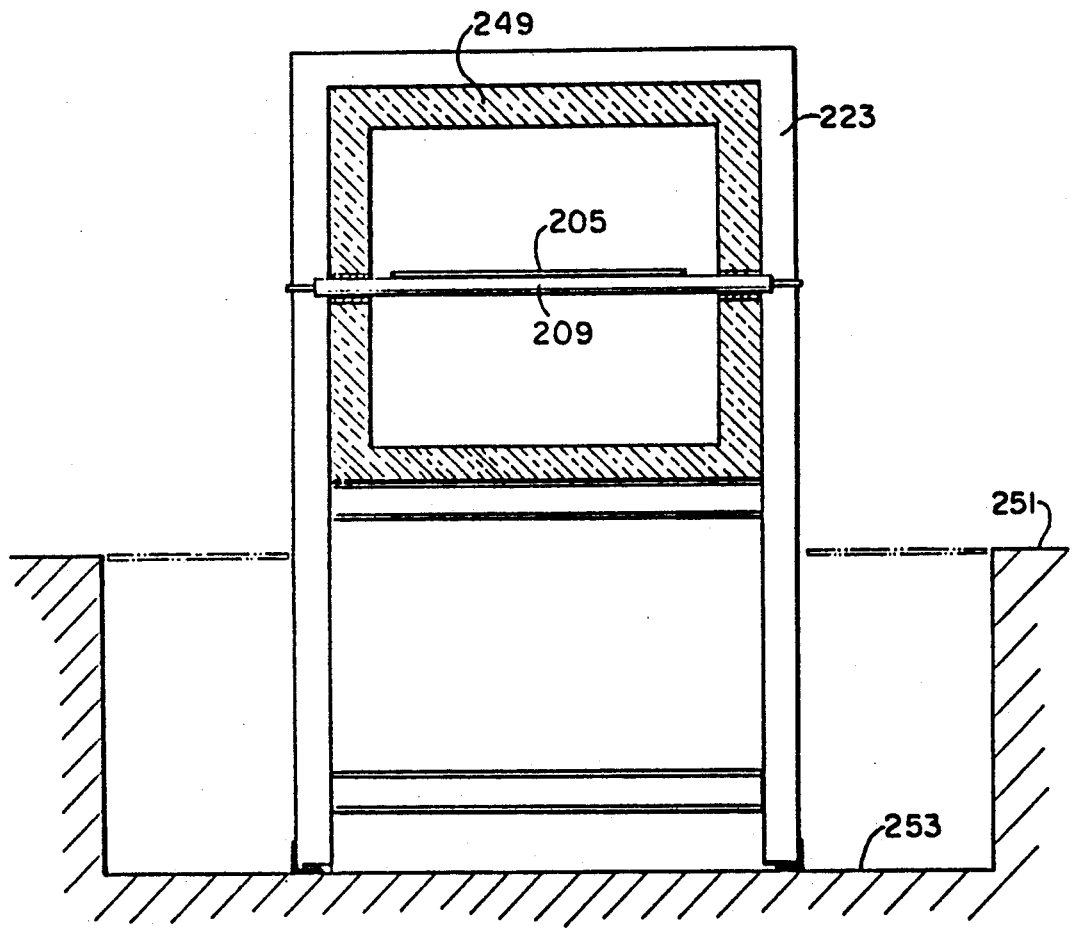
FIG. 26 is a view in cross-section of the machine of FIG. 24 taken as indicated by the lines and arrows 26—26 which appear in FIG. 24 and shows a heating section of an oven.

FIG. 25 is a longitudinal cross-section of the machine of FIG. 24 taken on the center line of the machine as indicated by the lines and arrows 25—25. The glass flow is from left to right, and flat glass lites 205 are hand-loaded onto a roller conveyor 207 at the loading section 189. The glass lites 205 are conveyed through the heating section of the oven 191 by fused silica rolls 209, as shown in FIG. 26 which is a view in cross-section taken as indicated by the lines and arrows of 26—26 which appear in FIG. 24. Note that in the one zone batch apparatus of FIGS. 1 and 2, the full-faced rolls 209 of FIG. 25 are replaced by disc rollers or mini-rollers. The last full-faced roll 209a in oven 191 is followed by longitudinal rows 211 of mini-rolls 213 in bending section 193. The longitudinal rows 211 of mini-rolls 213 are supported on rails 215 which may be raised and lowered to desired positions in order to form a desired contour which becomes the contour of the hot, softened glass sheet 205.

Rails 215 are supported on support posts 217 which are in turn supported on lift beams 219 that are mounted on lifting actuators 221 that raise and lower lift beams 219 and rails 215 and longitudinal rows 211 of mini-rolls 213 to desired contour positions. A support frame 223 supports the oven 191.

In quench section 195 and first cool section 197, FIG. 25 shows a support frame 225, upper quench and first cooling duct 227 for directing cold air onto the glass sheet's top surface, upper header duct 229 for directing cold air into the upper quench duct for quenching the upper surface of the glass sheets, and upper header duct 231 for supplying cool air to the upper first cooling duct which directs the cooling air onto the top surface of the glass sheets to cool them.

Upper lifting and lowering actuators 233 are provided for raising and lowering the longitudinal rows of upper quench and cooling ducts to close proximity to the upper surface of the glass sheets.

Lower quench and first cooling duct 237 is positioned below the glass sheets and is provided with a lower header duct 239 for supplying cold quenching air, and with lower header duct 241 which is supplied with cool air for the lower first cooling of the glass sheets. Lifting and lowering actuators 243 are provided for raising and lowering longitudinal rows of mini-rollers or disc rollers and lower quench tubes to fit the contour of the glass sheet as it exits from bending section 193 of oven 191.

FIG. 25 also shows final cooling section 199 which is provided with full-faced conveyor rollers 245 and lift actuators 301 for the conveyor rollers 245.

FIG. 26 is taken as indicated by the lines and arrows 26—26 which appear in FIG. 24 and shows the fused silica full-faced rolls 209, flat glass sheet 205, oven frame 223, oven insulation 249, operating floor 251, and pit floor 253.

Figure 27A:
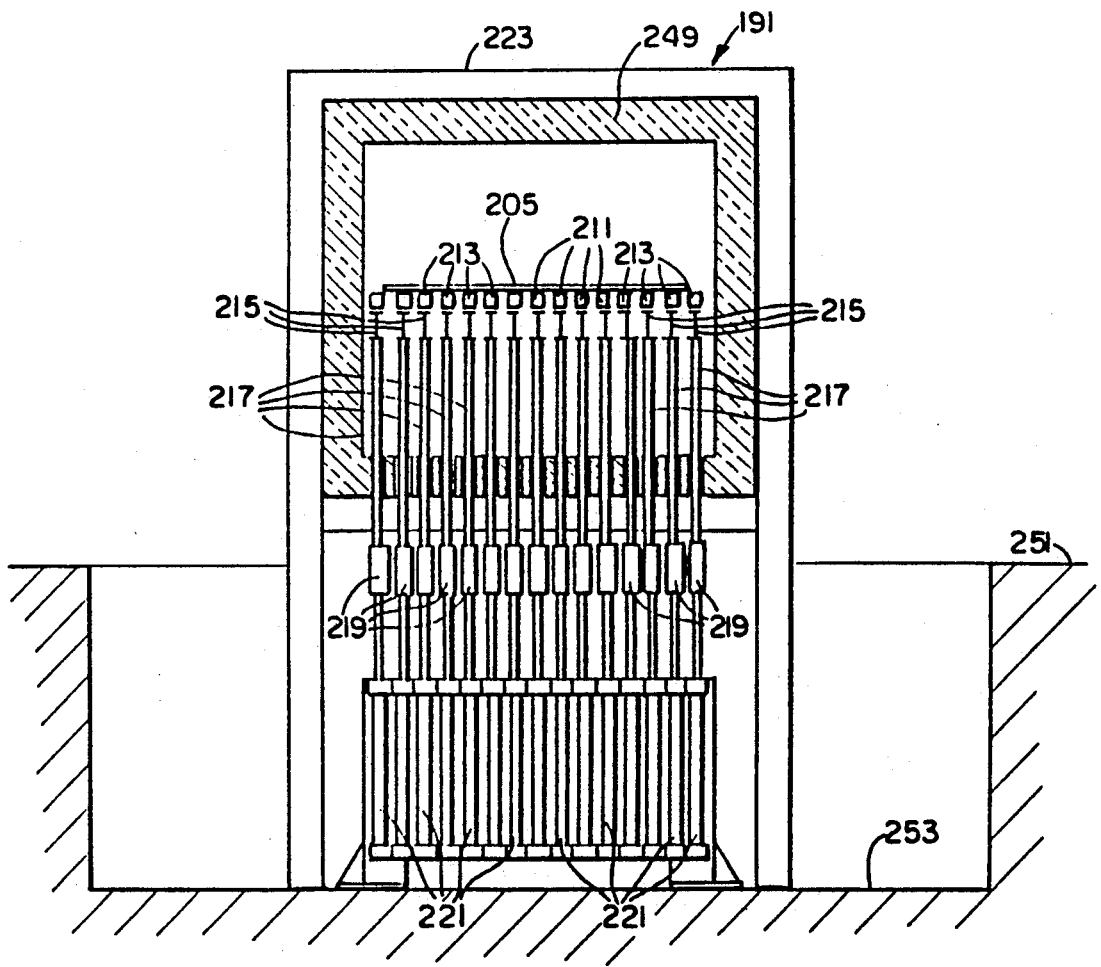
FIG. 27a is a view in cross-section of the machine of FIG. 24 taken as indicated by the lines and arrows 27—27 which appear in FIG. 24 and shows a bending section of the oven positioned for tempering a flat glass sheet.

FIG. 27a is a view in cross-section taken as indicated by the lines and arrows 27—27 which appear in FIG. 24 and shows oven frame 223, oven insulation 249, flat glass sheet 205, longitudinal rows 211 of mini-rolls 213 supported on longitudinal rails 215 that extend lengthwise in the oven 191, support posts 217 that support the longitudinal rails 215, and lift beams 219 that support the support post 217. Lifting and lowering actuators 221 lift and lower the rails 215 and the bending mini-rolls 213 to the desired contour of the bend desired in the glass sheet 205.

Figure 27B:
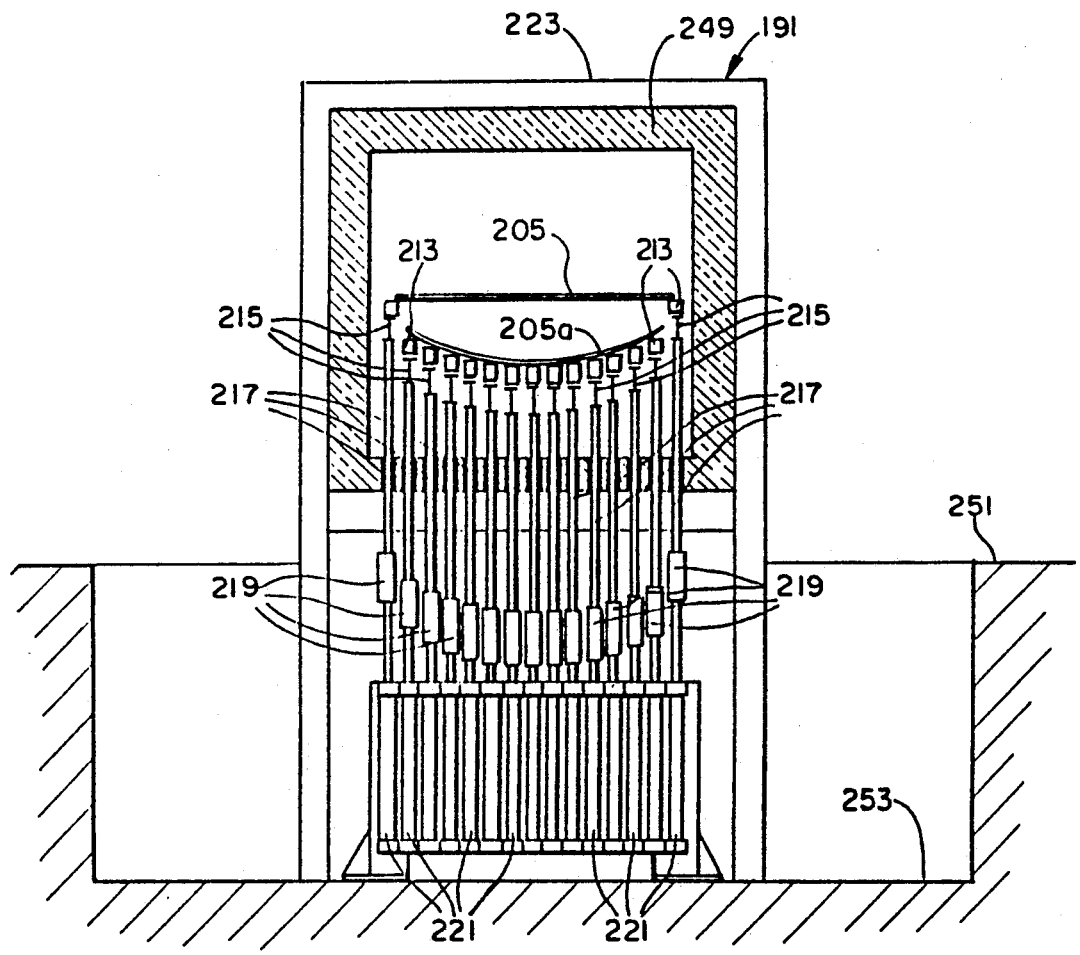
FIG. 27b is a view in cross-section of the machine of FIG. 24 taken as indicated by the lines and arrows 27—27 which appear in FIG. 24 and shows the bending section of the oven positioned for bending a flat glass sheet.

FIG. 27b is taken as indicated by the lines and arrows 27—27 in FIG. 24 and is the same view as in FIG. 27a but is taken at a later stage in the process when the glass sheet 205 has been heated to a hot, melted condition ready for bending. The number 205 indicates the flat glass entering the bending section 193, and the number 205a indicates the glass sheet after it has been bent and is leaving bending section 193. Lifting actuators 221 have been operated to change the vertical position of lifting beams 219, support posts 217, rails 215 and bending rolls 213 in each longitudinal row 211 of bending rolls 213 so that the bending rolls 213 assume the contour desired of the bent glass sheet 205a.

Figure 28:
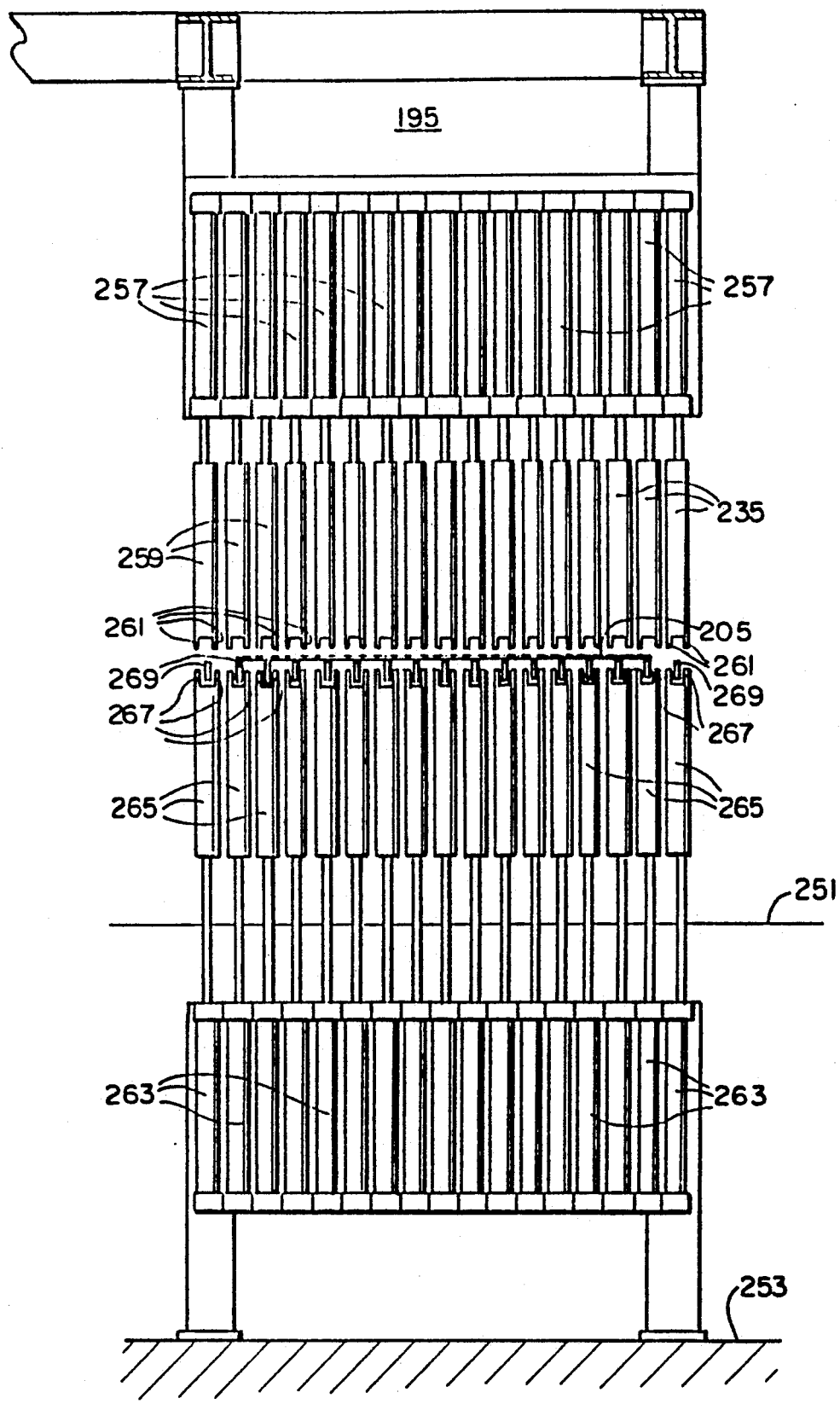
FIG. 28 is a view in cross-section of the machine of FIG. 24 taken as indicated by the lines and arrows 28—28 which appear in FIG. 24 and shows a cross-section through a quench section.

FIG. 28 shows a view in section taken as indicated by the lines and arrows 28—28 which appear in FIG. 24 and shows a cross-section through the quench section 195 with the upper lifting cylinders 257 for vertically positioning longitudinal rows 259 of upper quench ducts 235 and upper quench tubes 261 in close proximity to the upper surface of glass sheet 205.

FIG. 28 also shows longitudinal rows of lower lifting and lowering cylinders 263 for lifting and lowering longitudinal rows of lower quench ducts 265 and for positioning lower quench tubes 267 in close proximity to the lower surface of glass sheet 205. Quench rolls 269 are positioned between and supported by lower quench tubes 267.

Figure 29:
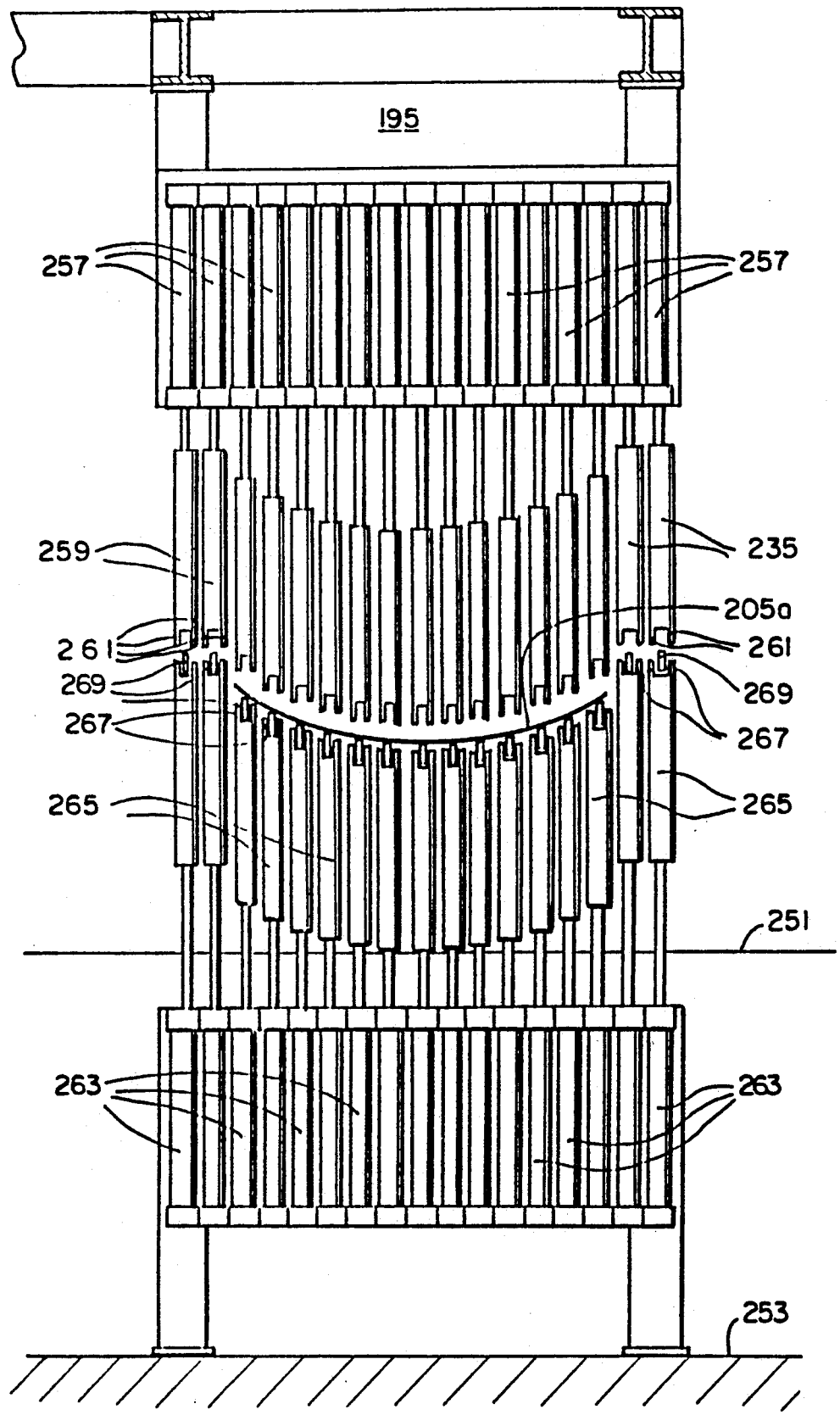
FIG. 29 is a view in cross-section of the machine of FIG. 24 taken as indicated by the lines and arrows 28—28 which appear in FIG. 24 and shows the quench section as it appears when the quench section is processing a bent glass sheet.

FIG. 29 is a view in section taken as indicated by the lines and arrows 28—28 which appear in FIG. 24 and shows quench section 195 as it appears when quench section 195 is processing a bent glass sheet 205a. Quench rolls 269 have assumed a contoured position to support the bent glass sheet 205a which is received from the bending section 193, lower quench tubes 267 which support the quench rolls 269 also have assumed a curved contour in order to blow cold air against the bottom surface of the contoured glass sheet 205a, and upper quench tubes 261 have assumed a contoured shape in order to be in close proximity to blow cold air onto the upper surface of the bent glass sheet 205a.

Figure 30:
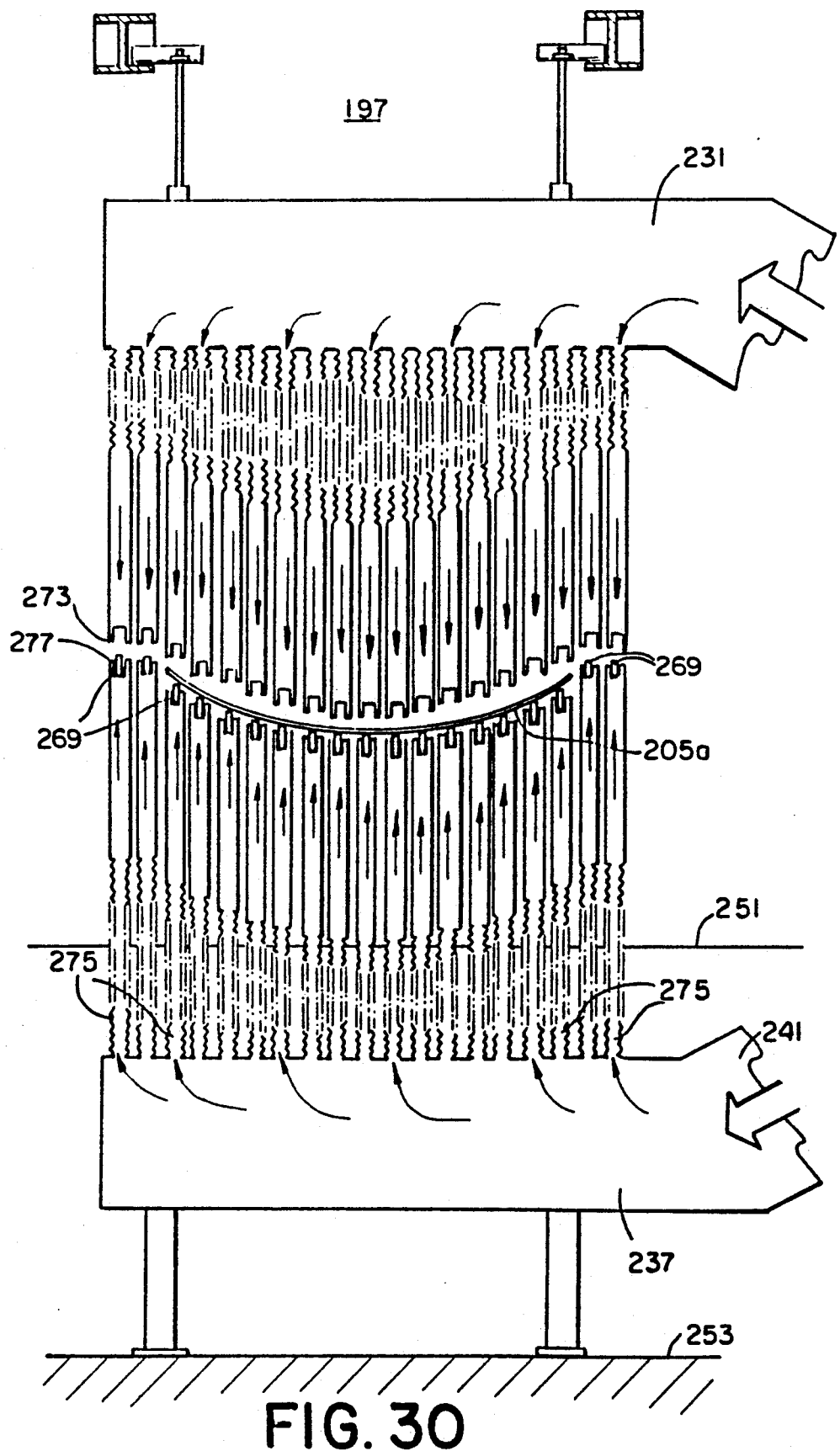
FIG. 30 is a view in cross-section of the machine of FIG. 24 taken as indicated by the lines and arrows 30—30 which appear in FIG. 24 and shows a cross-section of a first cooling section.

FIG. 30 is a view in section taken as indicated by the lines and arrows 30—30 which appear in FIG. 24 and shows a cross-section of the first cool section 197 with upper header duct 231 for the upper first cooling air, upper cooling air outlet tubes 273 which are positioned in close proximity to the upper surface of bent glass sheet 205a in order to efficiently direct cooling air onto the top surface of bent glass sheet 205a, lower first cooling header duct 241 for directing air upwardly through flexible boot connectors 275 through lower cooling outlet tubes 277 onto the lower surface of bent glass sheet 205a. Mini-rollers 269 are also positioned in cooling section 197 and they support the bent glass sheet 205a and hold it in contoured position while the sheet is cooling.

Figure 31:
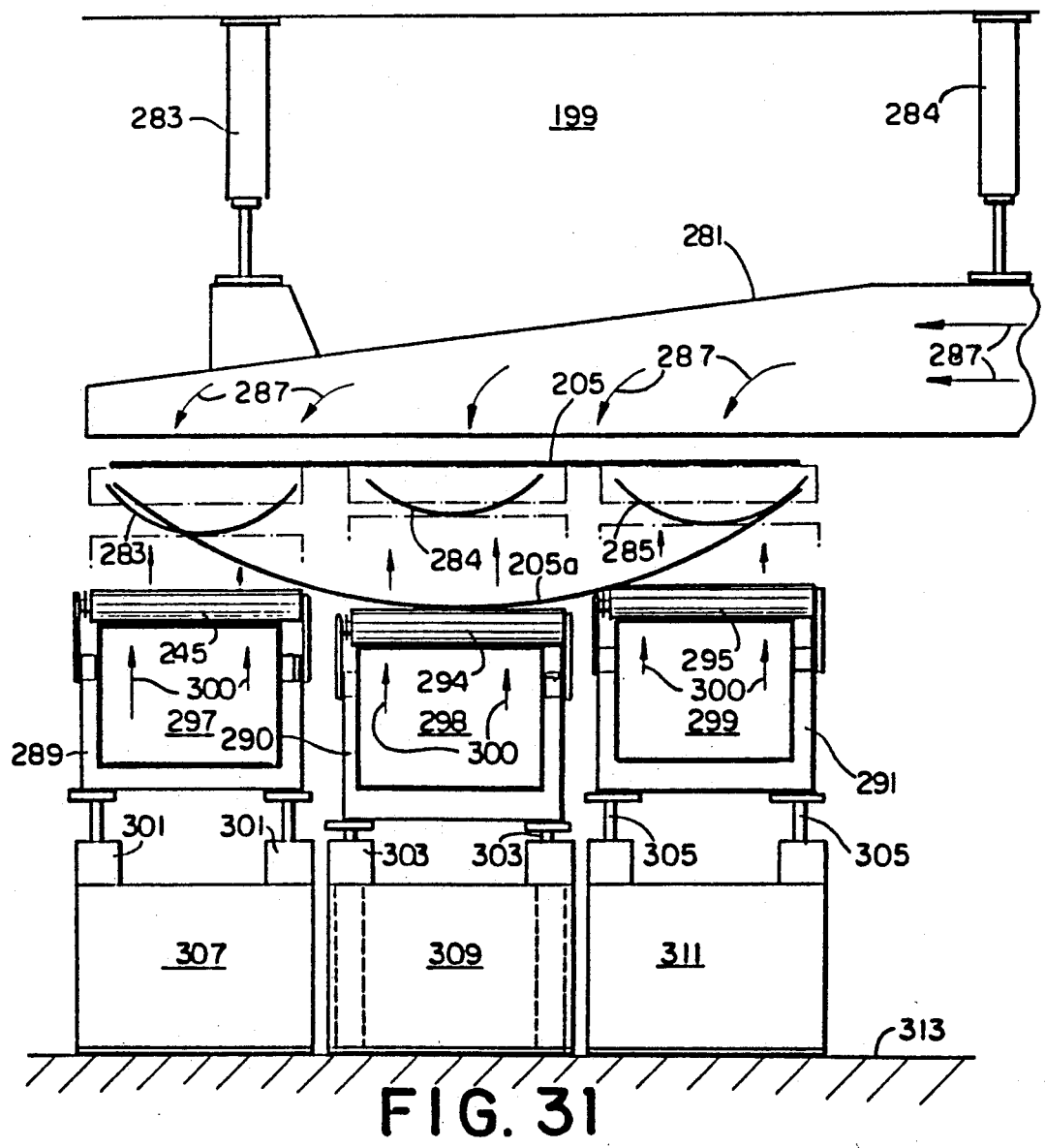
FIG. 31 is a view in cross-section of the machine of FIG. 24 taken as indicated by the lines and arrows 31—31 which appear in FIG. 24 and shows a cross-section of a final cooling section.

FIG. 31 shows a view in cross-section taken as indicated by the lines and arrows 31—31 which appear in FIG. 24 and shows a cross-section of the final cooling section 199. An upper cooling duct 281 is suspended from lift actuators 283, 284 which raise and lower upper cooling duct 281 so that it is in close proximity to the top surface of a flat glass sheet 205, or a curved glass sheet 205a, or a number of curved glass sheets 283-285. The upper cooling air flow is indicated by the lines and arrows 287.

The bottom surface of the glass sheets is supported by three conveyors 289-291 which support full-faced powered rollers 245, 294 and 295. A lower cooling duct 297 is positioned immediately below powered rollers 245, lower cooling duct 298 is positioned immediately below powered rollers 294, and lower cooling duct 299 is positioned immediately below powered rollers 295, and the lower cooling air flows upwardly through the space between the rollers as indicated by the lines and arrows 300.

Conveyor 289, together with its powered rollers 245 and lower cooling duct 297, is raised and lowered into position by lift actuators 301. Conveyor 290 with its powered rollers 294 and lower cooling duct 298 is raised and lowered by lift actuators 303, and conveyor 291 with its powered rollers 295 and lower cooling duct 299 is raised and lowered into position by lift actuators 305. Lift actuators 301 are mounted on support pedestal 307, lift actuators 303 are mounted on support pedestal 309, and lift actuators 305 are mounted on support pedestal 311. The support pedestals 307, 309 and 311 are mounted on operating floor 313.

The height of the powered rollers 245, 294 and 295 are adjustable to accommodate flat glass sheets 205 and also to accommodate bent glass of various depth.

FIG. 32 is a view in cross-section taken as indicated by the lines and arrows 32—32 which appear in FIG. 24 and shows the final cooling section 199 and the unloading section 201. FIG. 33 is a view taken as indicated by the lines and arrows 33—33 which appear in FIG. 32. Upper cooling air 287 is conducted from a blower 315 through an upper duct 317, a flexible duct 319, and upper cooling duct 281 through tubes 321 to impinge on the upper surface of flat glass sheet 205.

Lower cooling air 300 is blown from blower 315 through lower cooling duct 297 and flexible ducts 323-325 and through the spaces between rollers 245, 294 and 295 to impinge on the bottom surface of flat sheet 205.

FIG. 34 is a view showing the drive mechanism for the oven mini-rolls 213 and the quench rolls 269. Flat glass sheet 205 is brought into the oven 191 on loading conveyor drive rollers 207 and the flat glass 205 is supported in the oven 191 on mini-rolls 213 which are driven by a flat band 327 which forms a part of a flat band drive for the stub rollers 213a. Quench disc rollers 269 are driven in coordination with the oven mini-rollers 213 from a DC motor 329 which is connected to a drive shaft 331 by a belt or chain 333. Shaft 331 is connected to a shaft 335 by a timing belt 337 which is trained about rolls 339, 341 that are mounted on a piston 343 that extends from an air cylinder 345 which controls the tension of the belt 337 and takes up the slack in the belt 337 when the lift frames lower the longitudinal rows of rollers in the oven 191 and the quench section 195.

The oven mini-rollers 213 are powered by a roller chain 347 that extends from shaft 335 to the flat band drive shaft 349 which drives the flat band 327 and the mini-rollers 213.

The quench disc rollers 269 are driven by a twisted round belt 351 that extends from shaft 335 to a pulley 353 that is mounted on a line shaft 355. Twisted belts 357 extend from line shaft 355 to the quench disc rollers 269. Shaft 331 is the common drive shaft for all flat band and twisted belt drives including flat band 327 and twisted belts 35 and 357. An air cylinder 359 is connected to flat band shaft 361 to provide for band tension control.

FIG. 35a is an enlarged view in section taken as indicated by the lines and arrows 35—35 which appear in FIG. 34, and FIG. 35b is a side view of FIG. 35a looking from the right-hand side of FIG. 35a. FIGS. 35a-35b show a flat glass sheet 205 supported on an oven mini-roll 213 that has a band groove 363 that seats on band 327 and is driven thereby. Mini-roll 213 is mounted on a shaft 365 supported on mounting brackets 367 that extend upwardly from a base plate 369 mounted on a rail 215 by bolts 371. A band support bar 373 is mounted on base plate 369 to support the band 327 vertically.

Figure 36:
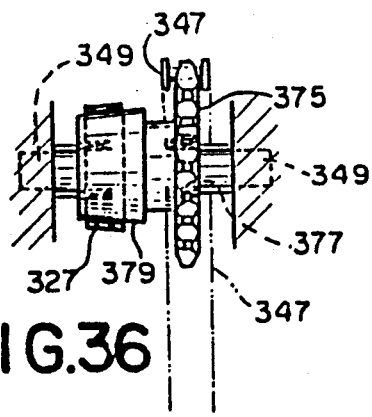
FIG. 36 is a side view in elevation taken as indicated by the lines and arrows 36—36 which appear in FIG. 34 and shows a roller chain and sprocket mounted on a shaft.

FIG. 36 is a view taken as indicated by the lines and arrows 36—36 which appear in FIG. 34 and shows roller chain 347 which extends from shaft 335 to shaft 349 and sprocket 375 which includes a bearing 377. Also mounted on shaft 349 is a crowned hub 379 which supports drive band 327.

Figure 37:
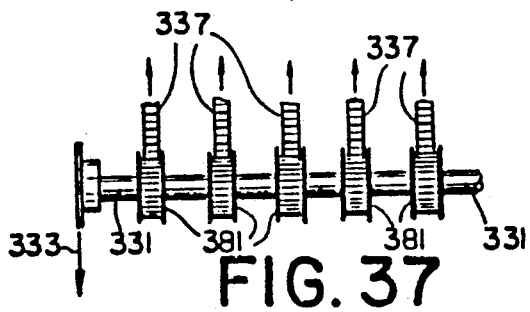
FIG. 37 is a side view in elevation taken as indicated by the lines and arrows 37—37 which appear in FIG. 34 and shows a drive shaft having pulleys mounted thereon.

FIG. 37 is a view taken as indicated by the lines and arrows 37—37 which appear in FIG. 34 and shows drive shaft 331 having pulleys 381 mounted thereon with timing belts 337 extending from the pulleys 381, and belt or chain 333 extending from the shaft 331 to the motor 329.

Figure 38:
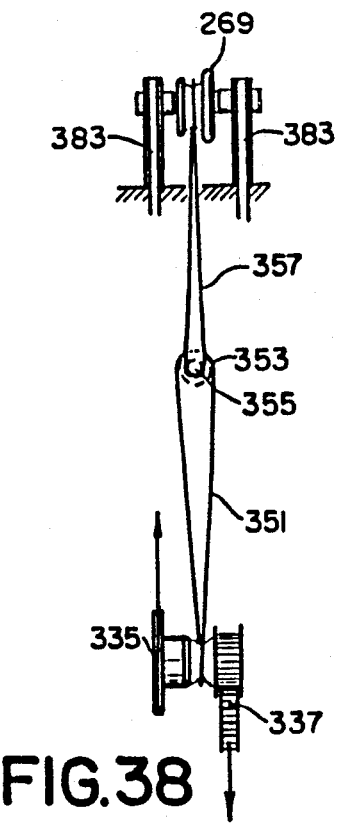
FIG. 38 is a side view in elevation taken as indicated by the lines and arrows 38—38 which appear in FIG. 34 and shows a drive mechanism for a quench disc roll.

FIG. 38 is a view taken as indicated by the lines and arrows 38—38 which appear in FIG. 34 and shows a timing belt 337, shaft 335, twist belt 351 which extends from shaft 335 to pulley 353 on line shaft 355, twisted belt 357 which extends from pulley 353 to quench disc roll 269 which is mounted on quench tubes 383.

If full-width flat glass lites 205 are to be tempered, the mini-rolls 213 in the bending section 193 are arranged in a horizontally-aligned pattern so that they present a segmented roll surface to the flat glass elite 205.

If full-width bent glass lites 205 are to be tempered in a continuous process, the mini-rolls 213 in the bending section 193 are pre-set to the required curvature as indicated in FIG. 27b. The mini-rolls 213 are always powered and convey the glass lites 205 forward, regardless of the elevation position of the mini-rolls 213.

In the batch system of FIGS. 1 and 2, when the oscillating glass sheet is fully heated, the oven rolls are quickly lowered to allow the glass lite to sag to the desired shape, as shown by glass sheet 205a in FIG. 27b.

Properly heated flat-glass lites 205 are rapidly conveyed into the quench section 195 which has the same flat transverse profile as the oven mini-rollers 213. Quench air flows from the upper quench duct and from the lower quench duct through the quench tubes to properly quench the flat glass lites 205, as shown in FIG. 28.

When vent glass lites 205a are properly heated, they are conveyed into the quench section 195 whose profile of rollers has been pre-set to match that of the bent glass, as shown in FIG. 29.

Whether flat or bent, the glass lites are conveyed through the quench section 195 by longitudinal rows of powered short rolls similar to those in the bending section 193 of oven 191. Quench and first cooling air flows are supplied to the individual outlet tubes 273, 277 by upper header duct 231 and lower header duct 241 as shown in FIG. 30.

As shown in FIG. 31, quenched lites 205, 205a, 283-285 are conveyed into the final cooling section 199 by the profiled powered rolls 245, 294 and 295 of the first cooling section 197. A wide range of shapes of glass sheets may be presented to the final cooling section 199, and the glass lites may be at different elevations. FIG. 31 shows a composite view of some of the different shaped glass lites and their combinations. In the arrangement shown, three individually adjustable height conveyors 289-291 are pre-set to present the particular elevations required to accept the glass lites coming from the first cooling section 197.

The unloading section 201 comprises three plane roller conveyors having no cooling, but having separate height control as do the conveyors in the final cooling section 199.

In the batch process of FIGS. 1 and 2, the final cooling section comprises one full-width roller conveyor, and the top of its rollers are fixed at the elevation of the bottom of the deepest bent lite that the process produces All bent, quenched lites having lesser depth, and all flat lites, are lowered to the top of the rolls of the unload conveyor so that all lites are discharged at the same bed height. The unloading section also has one full-width conveyor at the fixed discharge elevation.

Referring to FIG. 25, each oven lift frame module comprises one lift beam 219, two lift actuators 221, and enough longitudinal rails 215 support post 217, mini-rolls 213, and drives as required to suit maximum glass size.

Quench section 195 and first cooling section 197 share one upper duct 227 and one lower duct 237, and share upper actuators 233 and lower actuators 243, and are provided with enough rollers and roll drives to suit maximum glass size.

The length of the continuous bending section 193 is such that all of the glass sheets of maximum length are on the bed of the bending mini-rolls 213 when the leading edge of the glasslite is still about 12 inches inside the exit end of the oven 191.

The lower part of the first cooling section 197 is provided with the same disc rolls as those provided in the quench section 195. Therefore, the first cooling section 197 cradles the bent glass lite in its curved configuration.

FIG. 27b shows heated flat glass sheet 205 entering the fully profiled bending section 193 of oven 191, and also shows the bent glass sheet 205a as it leaves the bending section 193 Note that the flat glass sheet 205 is conveyed by the outermost mini-rolls 213 until the glass sheet begins to sag, whereupon the sagging glass contacts additional mini-rolls which assist in driving the glass through the machine toward the unloading conveyor section 201.

In the batch system of FIGS. 1 and 2, the flat glass sheet is oscillated in the oven on mini-rolls. When the glass sheet is fully heated, these mini-rolls are quickly lowered to the position shown in FIG. 27b.

As shown in FIGS. 28 and 29, the glass sheets 205, 205a are conveyed by driven disc rollers 269 regardless of the elevation position of the disc rollers. The distance from the ends of the lower quench tubes 267 to the lower surface of the glass lite 205, 205a is fixed by the distance between the top of the tubes to the top of the quench rollers 269.

FIG. 30 shows the continuing cradling of the glass lites 205, 205a, and the configured conveying by the rollers 269 and the continued use of air nozzles, in this first cooling section, just as it was done in the quench section 195.

FIG. 31 shows the cooling air entering the lower final cooling ducts 297-299. The air flow to the underside of the glass lites 205, 205a is from the lower ducts between the full-faced rolls 245, 294, 295, and this is also shown in FIG. 32. The upper final cooling duct 281 is a vertically adjustable full-length, full-width duct. The duct configuration shown in FIG. 33 may be tailored for best air flow characteristics.

Figure 39:
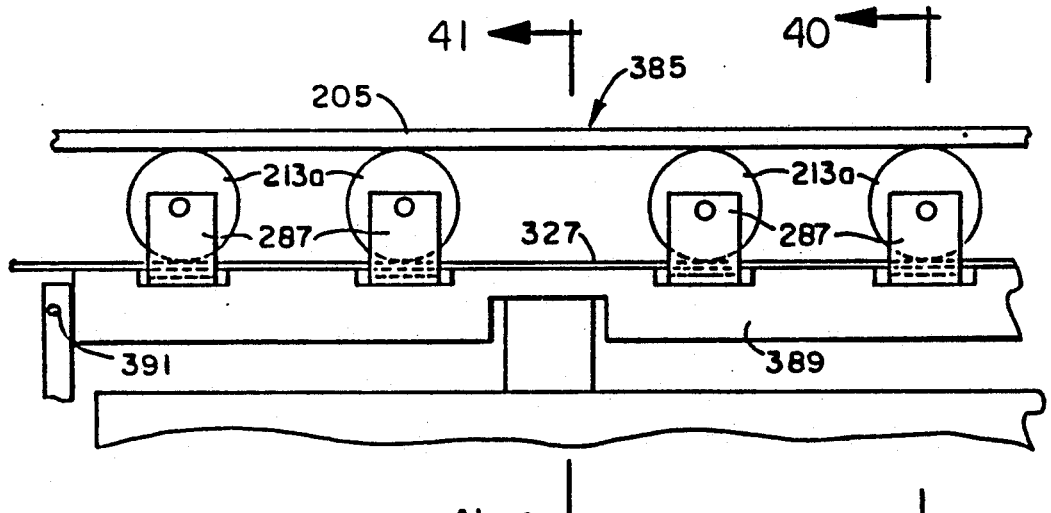
FIG. 39 is a side view in elevation of a preferred from of roller assembly for the bending section in the oven.
Figure 40:
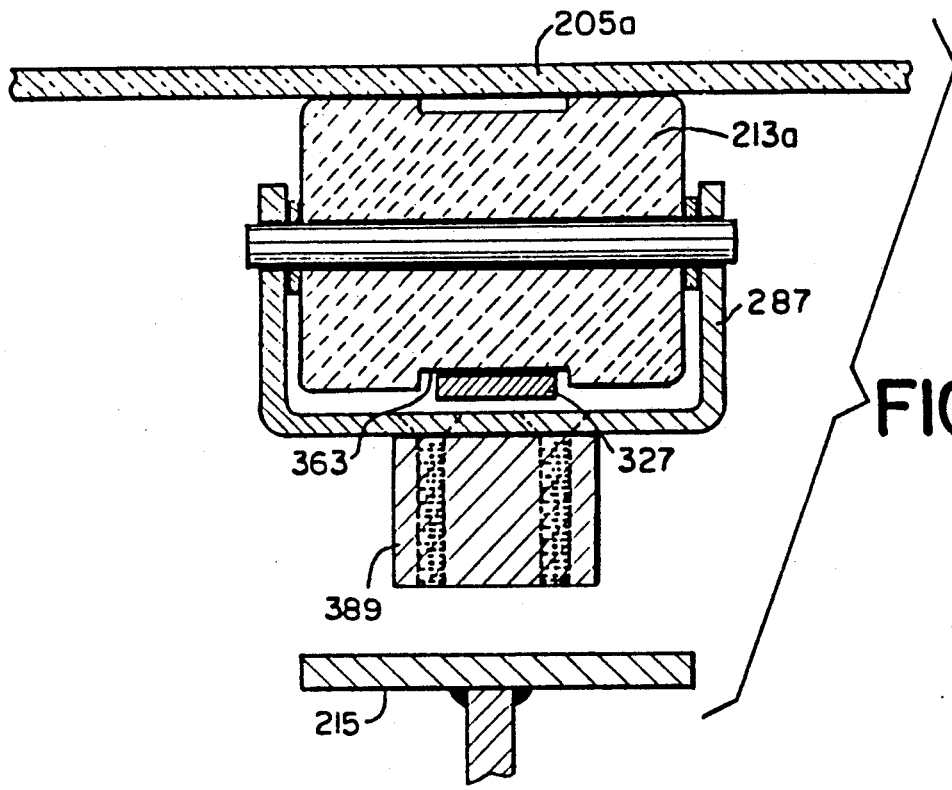
FIG. 40 is a view in cross-section of the roller assembly of FIG. 39 taken as indicated by the lines and arrows 40-40 which appear in FIG. 39 and shows the roller and a support shaft in a flat position.
Figure 41:
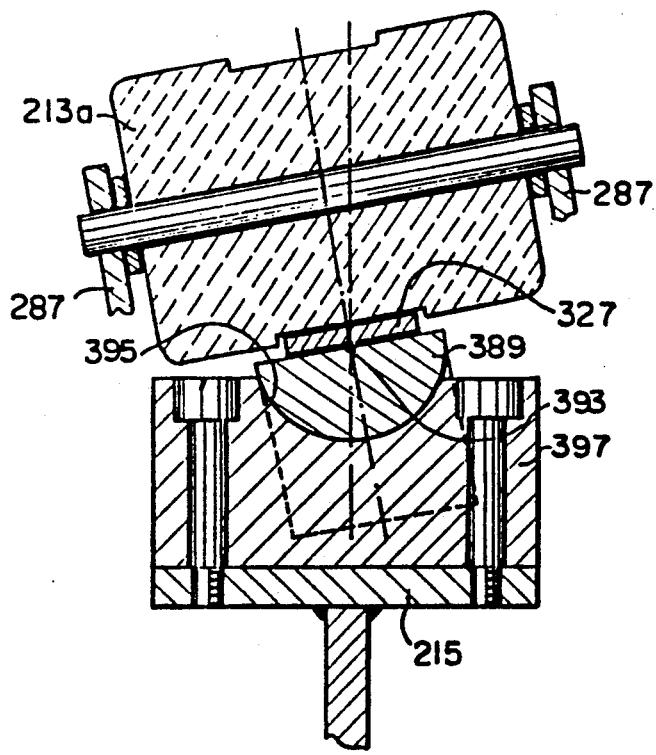
FIG. 41 is a view in cross-section of the roller assembly of FIG. 39 taken as indicated by the lines and arrows 41-41 which appear in FIG. 39 and shows a roller and a support shaft in a tilted position.

FIG. 39 shows a preferred form of roller assembly 385 for the bending section 193 in oven 191. FIG. 40 shows stub rollers 213a mounted in roller brackets 287 and steel drive bands 327 are positioned in band grooves 363 in the rollers 213a. The rollers 213a, roller bracket 287 and drive band 327 are all mounted on a pivoting support shaft 389 which has a link arm at one end which is connected to a stepper motor. Link arm 391 is shown in FIG. 39. Once the glass sheet 205 reaches bending temperature, and the longitudinal rows of rollers 213a are actuated to assume the contour of the desired bend in the glass sheet 205a, the longitudinal rows of rollers 213a are moved to the desired vertical positions. All rolls 213a are positioned so that they tangent to the bottom surface of the curved glass sheet 205a in order to provide good overall glass sheet support when the glass sheet is in its bent condition, thus greatly minimizing optical distortion of the bent glass sheet 205a. It is important to note that the location of support shaft pivot point 393, shown in FIG. 41, is on the surface of the steel drive band 327. Any location of the pivot point 393 other than at this point would cause the band 327 to track improperly when tilting the rollers 213.

In FIG. 41, support shaft 389 is shown positioned in the upper groove 395 of cradle bearing block 397 which is bolted to roller support rail 215.

Figure 42:
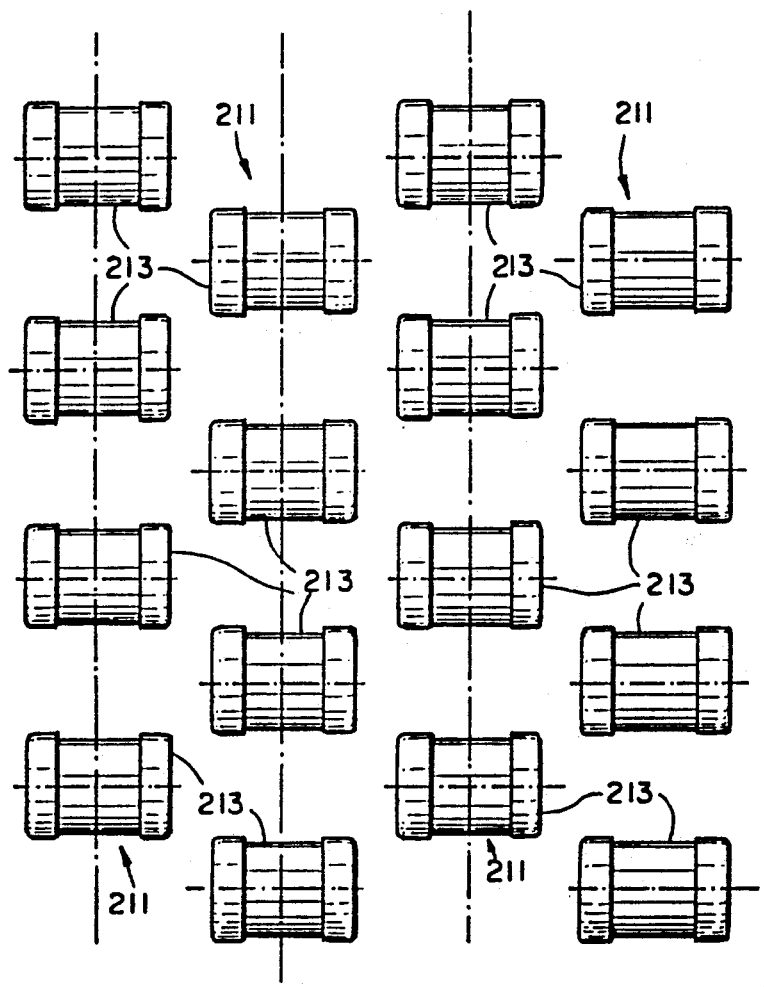
FIG. 42 is a top plan view of a bending roller bed that uses the roller assembly of FIGS. 39-41.

FIG. 42 illustrates the offset between longitudinal rows 211 of mini-rollers 213. This arrangement provides more complete glass sheet support which reduces optical distortion.

Figure 43:
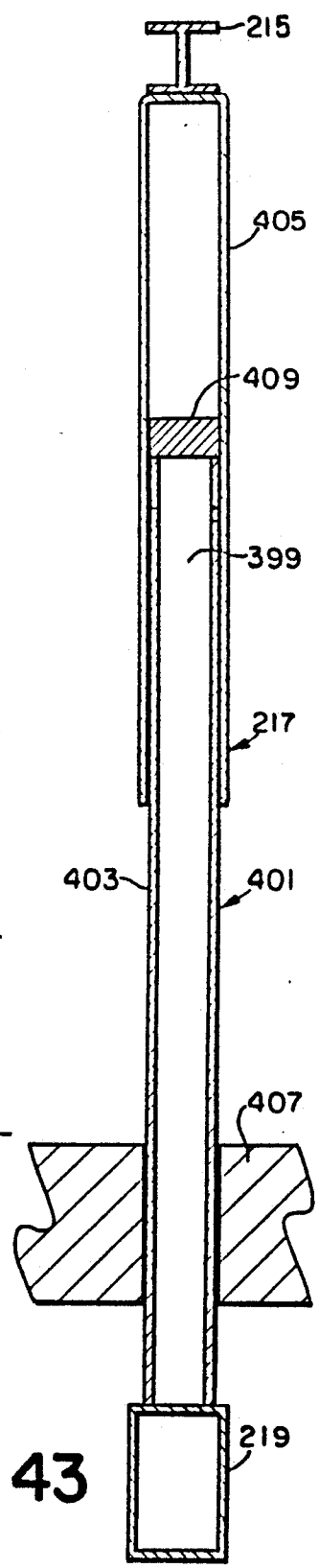
FIG. 43 is a side view in elevation of a support post which extends between a lift beam and a roller rail.

FIG. 43 illustrates a support post 217 which runs from the bottom of roller rails 215 to the top of the lift beams 219. A fused silica column 399 is positioned inside of a telescoping steel tube assembly 401 which comprises an inner post tube 403 and an outer post tube 405 that telescopes over inner tube 403. The upper portion of support post 217 is bolted to rail 215, and the lower portion of support post 217 is bolted to lift beam 219. The posts 217 extend through the hearth 407 of oven 191, and a welded plug 409 is provided at the top of fused silica column 399.

Posts 217 extend through the hearth 407 into the interior of the oven 191 and thereby extend from an ambient temperature outside the oven 191 into the hot temperature inside the oven 191. The length of the posts 217 exposed to the heat of the oven varies depending upon the curvature of the bed of rollers 213. Fused silica is used in column 399 because it has minimal thermal expansion and enables the rollers 213 to maintain their position regardless of variations in temperature.

Figure 44:
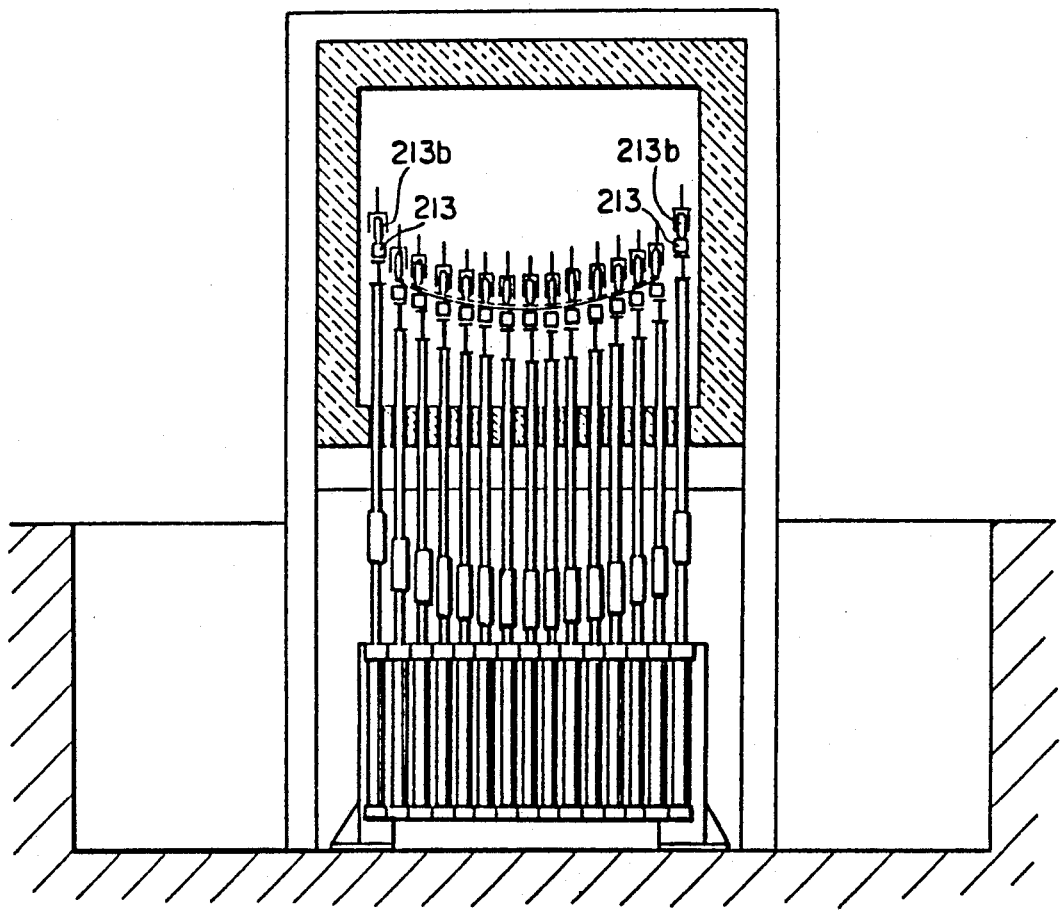
FIG. 44 is a view in cross-section of another embodiment of the bending section of the oven as previously shown in FIG. 27.

FIG. 44 shows another embodiment of the bending section 193 of oven 191 as previously shown in FIG. 27, and incorporates an optional set of bending rollers 213b for contacting the top surface of glass sheets 205a. This provides the apparatus with the capability of doing bends to the glass sheets 205a that are beyond the scope of bends obtainable in normal side bending Bend rollers 213b also provide the apparatus with the capability of obtaining reverse bends in the bent glass sheets 205a.

The invention provides affordable tempering apparatus to process both flat and bent glass sheets, and to process the flat and bent glass sheets either concurrently or separately. The apparatus also has the capability of making rapid changeovers, without having to retool or remold.

In addition to providing a flat glass temperer with the capability of continuing in the flat glass tempering business, the glass temperer should also be able to expand his market into the following areas:
automotive side lites—bent
boat and recreational vehicles—bent
industrial vehicles—bent
shower enclosures—bent
architectural—bent
refrigeration and display cases—bent
greenhouses—bent The inventive apparatus may be built as either a batch-type of FIGS. 1 and 2 or a continuous type of FIG. 25.

The new roller bed apparatus of the invention provides the ability to produce both bent and flat tempered glass sheets. It utilizes a series of, preferably, fused silica mini-rollers, or it uses discs, which are arranged in longitudinal rows that are actuated vertically up and down to form the desired contour for a sheet or sheets of glass. Since "home position" is in the normal, flat plane, the apparatus has the ability or capability to bend or not to bend. Each longitudinal row of driven rollers is mounted on a frame connected to a pair of actuators at the ends of the longitudinal rows of mini-rollers for raising and lowering the longitudinal rows of mini-rollers to a desired position to form a desired transverse contour of the rollers to form a desired bend in the glass sheets. When the glass sheets reach the softening point, the various longitudinal rows of rollers are actuated to move vertically to form a pre-determined contoured transverse bed and then the heated glass sags to match the particular curved contour of that bed.

In the continuous process of FIG. 25, the reheating is done in the full-faced roller bed of oven 191 and then the softened glass sheets travel into bending section 193 supported by the outermost bending rollers and the glass sheet sags onto the contour of the inner rollers as the glass sheet travels toward the unloading section 191 of the machine.

The quench section 195 also comprises a series of rows of longitudinal discs or mini-rollers each having a pair of actuators at the ends of the longitudinal rows to raise and lower each longitudinal row of rollers to a contoured position. The quench tubes support the rollers, and the rollers in the quench section have the same contour as the rollers in the bending section 193 so as to support the bent glass sheets 205a.

First cooling section 197 is in close proximity to the final stage of quench section 195 so that the roller bed contour remains the same so as not to disturb the contour of the glass sheets 205a.

The final cooling section 199 and the unload section 201 both use full-faced rollers which form a flat surface for accepting the glass sheets from the preceding sections which may now have a curved surface. The cooling ducts in the cooling section 199 use a higher pressure for bent glass sheets than for flat glass sheets to compensate for the wider gaps between the cooling ducts and the bent glass sheets.

In operation of the continuous method and apparatus for making bent glass sheets shown in FIGS. 24-38, a flat glass lite 205 is hand-loaded (FIG. 25) onto roller conveyor 207 at the loading section 189 and is moved to oven 191. Glass lites 205 are conveyed (FIG. 26) through the heating section of oven 191 on full-faced rolls 209, where glass sheet 205 is heated to a hot, softened condition and is hen moved onto longitudinal rows 211 (FIG. 27a) of mini-rolls 213 in bending section 193 in oven 191. At this point, glass sheet 205 is still flat.

To bend the hot, softened glass sheet 205 (FIG. 27b), lifting actuators 221 are operated to lower lifting beams 219 and support posts 217, which support rails 215, to desired positions to form a desired contour of longitudinal rows 211 of mini-rolls 213, which becomes the contour of the hot, softened bent glass sheet 205a.

Bent glass sheet 205a is conveyed (FIG. 29) from bending section 193 into quench section 195 and onto quench rolls 269, which have assumed a contoured position to support the bent glass sheet 205a. Similarly, lower quench tubes 267, which support quench rolls 269, and upper quench tubes 261 have assumed a contoured shape in order to be in close proximity to the surface of bent glass sheet 205a.

In quench section 195, quench air from upper header duct 229 flows into upper quench and first cooling duct 227 and then into upper quench ducts 235 and through quench tubes 261 onto the top surface of the bent glass sheet 205a. Similarly, quench air flows through lower header duct 239 into lower quench and first cooling duct 237, and then into lower quench ducts 265 and through quench tubes 267 onto the bottom surface of bent glass sheet 205a to quench glass sheet 205a.

Bent glass sheet 205a continues to move on quench rolls 269 into first cool section 197, where cool air (FIG. 30) flows through upper header duct 231, through upper quench and first cooling duct 227, and through upper cooling air outlet tubes 273 onto the top surface of bent glass sheet 205a. Cool air also flows through lower header duct 241, through lower quench and first cooling duct 237, and then through lower cooling air outlet tubes 277 onto the bottom of bent glass sheet 205a to cool it.

The cooled glass sheet 205a then moves into final cooling section 199 (FIG. 31) where it is supported on full-faced powered rollers 245, 294 and 295. Conveyors 289-291, which support full-faced powered rollers 245, 294 and 295, have been positioned to conform to the contoured shape of the bent glass sheet 205a.

Glass sheet 205a is cooled with cooling air which flows through an upper cooling duct 281 and lower cooling ducts 297, 298 and 299 onto the glass sheet 205a.

As the final step, bent and cooled glass sheet 205a moves from final cooling section 199 to unloading section 201, where it is unloaded from the machine.

In operation of the glass bending apparatus shown in FIGS. 24-38 for tempering a flat sheet of glass, flat glass lites 205 (FIG. 25) are hand-loaded on roller conveyor 207 at the loading section 189. Glass lites 205 are conveyed through the heating section of oven 191 (FIG. 26) on fused silica rolls 209. The glass sheet moves from the heating section of oven 191 onto longitudinal rows 211 of mini-rolls 213 in bending section 193.

Up to this point, the operation for tempering flat glass is the same as for bending glass sheets. Unlike the operation for bending glass, however, the vertical position of mini-rolls 213 (FIG. 27a), when used for tempering, is not changed, but rather mini-rolls 213 retain a flat contour for tempering glass sheet 205.

Flat glass sheet 205 moves from bending section 193 onto quench rolls 269 (FIG. 28) in quench section 195. Like mini-rolls 213 in bending section 193, quench rolls 269 have a flat contour. Flat glass sheet 205 is quenched with air from upper quench and first cooling duct 227 and lower quench and first cooling duct 237, and then moves on quench rollers 269 into first cooling section 197 where the flat glass sheet 205 is cooled.

The flat glass sheet then moves to final cooling section 199 (FIGS. 31, 33) where cool air from an upper cooling duct 281 cools the top surface of flat glass sheet 205, and cool air from lower cooling ducts 297, 298 and 299, which are positioned immediately below powered rollers 245, 294 and 295, cools the bottom surface of the flat glass sheet 205.

The flat glass sheet moves from final cooling section 199 to unloading section 201 where the flat glass sheet is unloaded from the bending glass apparatus.

In operation of the roller assembly 385 shown in FIGS. 39-42, a glass sheet 205 is heated in the normal manner in the heating section of oven 191, and is conveyed on rolls 209 into bending section 193 and onto stub rollers 213a. When glass sheet 205 has reached bending temperature, the longitudinal rows 211 of stub rollers 213a are actuated and the vertical position of rows 211 is changed to assume the contour of the desired bend in the glass sheet 205. When the longitudinal rows 211 of stub rollers 213a move, a link arm 341 (FIG. 39) pivots support shaft 389, which causes stub rollers 213a to pivot (FIG. 41) around pivot point 393 so that the top surface of stub roller 213a is tangent to the bottom surface of curved glass sheet 205a.

We claim:

1. A roller assembly for bending sheets of glass, including a plurality of units each comprising,
   a plurality of rollers,
   a plurality of bracket means which are respectively attached to the rollers for supporting the rollers and allowing the rollers to rotate,
   a pivotal support shaft on which the bracket means and the rollers are disposed and supported,
   power means connected to the rollers for causing rotation thereof,
   supporting means for supporting the support shaft,
   raising and lowering means attached to the supporting means for changing the vertical position of the supporting means to a desired position for glass bending, and
   means attached to the support shaft for pivoting the support shaft such that when the supporting means is raised or lowered, and a glass sheet supported on top of the rollers bends to conform to the contour of the rollers, as the support shaft pivots the rollers are tilted in planes which are substantially perpendicular to a longitudinal direction of the support shaft, the surfaces of the rollers thereby remaining tangent to the bottom surface of the glass sheet.

2. The roller assembly of claim 1, each of the plurality of units being independently vertically movable and having a positioning of rollers along the length of the support shaft which is offset with respect to a positioning of rollers along the length of each support shaft of adjacent units.

3. The roller assembly of claim 1, the raising and lowering means comprising a telescoping steel tube and fused silica column positioned inside the tube.

4. The roller assembly of claim 1, further comprising a grooved pivotal support connected to the support shaft and to the supporting means, the support shaft pivoting in a groove of the pivotal support.

5. The roller assembly of claim 1, further comprising a plurality of bending rollers and means for supporting the bending rollers, for contacting the top surface of the glass sheet.

6. The roller assembly of claim 1, the assembly being positioned in an oven.

7. The roller assembly of claim 1, wherein
   the roller power means includes a circumferential groove formed in each of the rollers
   a drive band mounted below the rollers that engages the circumferential groove on the underside of the rollers and causes the rollers to rotate, and
   means for powering the drive band to move.

8. A roller assembly for bending sheets of glass, including a plurality of units each comprising,
   a plurality of rollers,
   a plurality of bracket means which are respectively attached to the rollers for supporting the rollers and allowing the rollers to rotate,
   a pivotal support shaft on which the bracket means and the rollers are disposed supported,
   power means connected to the rollers for causing rotation thereof,
   supporting means for supporting the support shaft,
   raising and lowering means attached to the supporting means for changing the vertical position of the supporting means to a desired position for glass bending,
   means attached to the support shaft for pivoting the support shaft such that when the supporting means is raised or lowered, and a glass sheet supported on top of the rollers bends to conform to the contour of the rollers, as the support shaft pivots the rollers are tilted in planes which are substantially perpendicular to a longitudinal direction of the support shaft, the surfaces of the rollers thereby remaining tangent to the bottom surface of the glass sheet;
   each of the plurality of units being independently vertically movable and having a positioning of rollers along the length of the support shaft which is offset with respect to a positioning of rollers along the length of the support shaft of adjacent units,
   a grooved pivotal support connected to the support shaft and to the supporting means, the support shaft pivoting in a groove of the pivotal support,
   the raising and lowering means comprising a telescoping steel tube and fused silica column positioned inside the tube, and
   a plurality of bending rollers and means for supporting the bending rollers, for contacting the top surface of the glass sheet.

* * * * *